United States Patent
Hara et al.

(10) Patent No.: US 11,052,773 B2
(45) Date of Patent: Jul. 6, 2021

(54) VEHICLE STRUCTURE OF ELECTRIC AUTOMOBILE

(71) Applicant: Toyota Jidosha Kabushiki Kaisha, Toyota (JP)

(72) Inventors: Yasuhiro Hara, Nagoya (JP); Ayano Tsuruta, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 16/540,453

(22) Filed: Aug. 14, 2019

(65) Prior Publication Data

US 2020/0062131 A1 Feb. 27, 2020

(30) Foreign Application Priority Data

Aug. 21, 2018 (JP) .............................. JP2018-154934

(51) Int. Cl.
| | |
|---|---|
| B60L 50/64 | (2019.01) |
| B62D 21/18 | (2006.01) |
| B62D 31/02 | (2006.01) |
| B62D 21/15 | (2006.01) |
| B62D 39/00 | (2006.01) |
| B60L 15/00 | (2006.01) |

(52) U.S. Cl.
CPC ............ *B60L 50/64* (2019.02); *B62D 21/155* (2013.01); *B62D 21/18* (2013.01); *B62D 31/02* (2013.01); *B62D 39/00* (2013.01); *B60L 15/007* (2013.01); *B60L 2220/50* (2013.01)

(58) Field of Classification Search
CPC .... B60L 50/64; B60L 15/007; B60L 2220/50; B62D 21/18; B62D 21/155; B62D 31/02; B62D 39/00
See application file for complete search history.

(56) References Cited

U.S. PATENT DOCUMENTS

| | | | | |
|---|---|---|---|---|
| 5,251,680 | A * | 10/1993 | Minezawa | ............. B60K 28/10 180/169 |
| 9,494,940 | B1 * | 11/2016 | Kentley | ................ B60W 10/04 |
| 9,845,123 | B2 * | 12/2017 | Byrnes | ..................... B60L 50/60 |
| 2016/0207418 | A1 * | 7/2016 | Bergstrom | ............... B60K 1/04 |
| 2018/0015839 | A1 * | 1/2018 | Ito | ............................ B60K 1/04 |
| 2018/0095473 | A1 | 4/2018 | Fakhfakh et al. | |

OTHER PUBLICATIONS

News Release "Toyota Launches New Mobility Ecosystem and Concept Vehicle at 2018 CES", Jan. 8, 2018, Las Vegas, <https://global.toyota/en/newsroom/corporate/20546438.html>.
U.S. Appl. No. 16/543,808, filed Aug. 19, 2019; Inventors: Yasuhiro Hara et al.
U.S. Appl. No. 16/543,902, filed Aug. 19, 2019; Inventors: Ayano Tsuruta et al.

* cited by examiner

Primary Examiner — Bryan A Evans
(74) *Attorney, Agent, or Firm* — Dinsmore & Shohl LLP

(57) ABSTRACT

There is provided a vehicle structure of an electric automobile including: a center module having a battery that is accommodated beneath a floor of a vehicle cabin; a front module that is joined to a vehicle front side of the center module; a rear module that is joined to a vehicle rear side of the center module; a driving unit that is provided at one of the front module or the rear module, and that is connected to the battery; and a control unit that is provided at another of the front module or the rear module, and that controls autonomous driving of the vehicle.

14 Claims, 16 Drawing Sheets

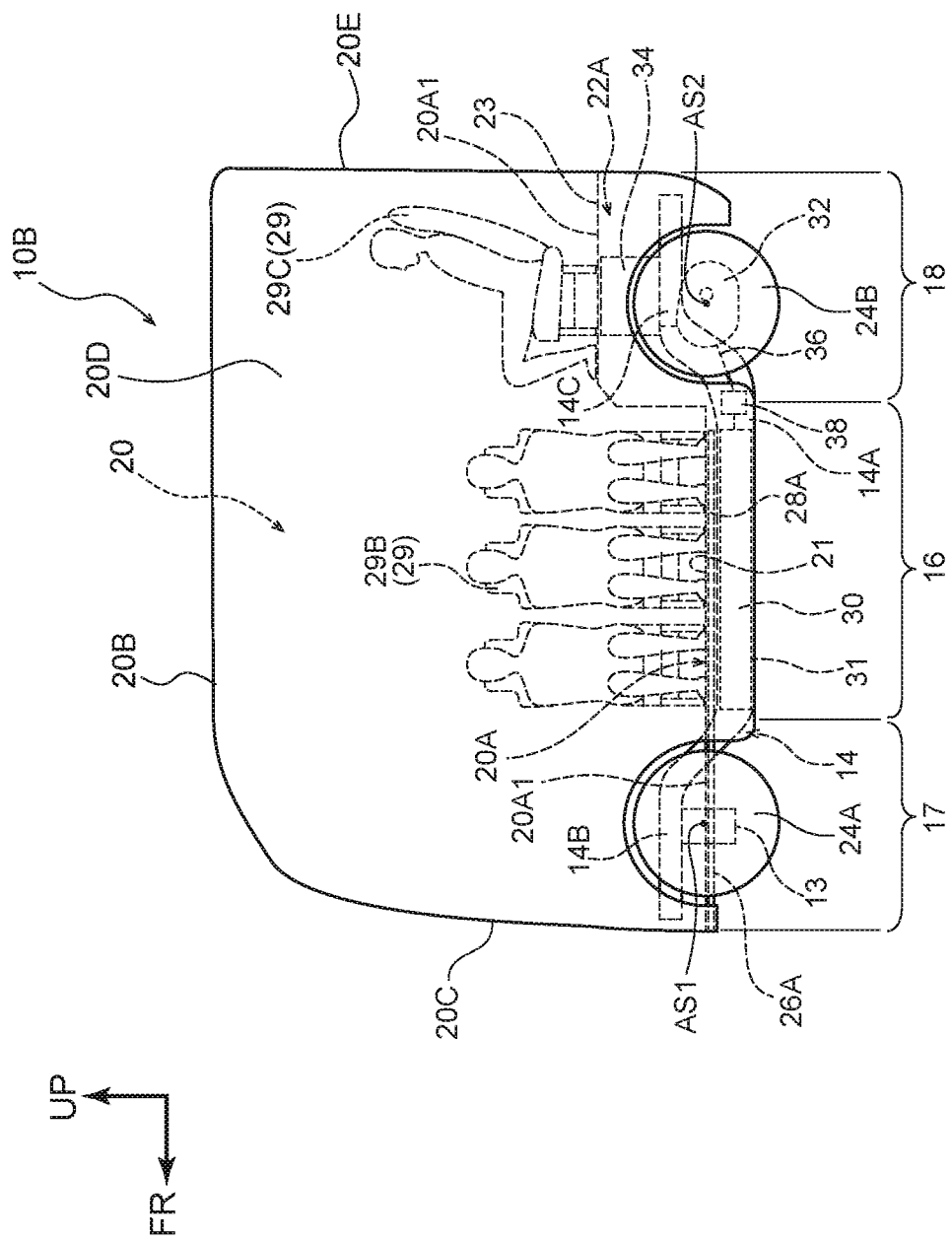

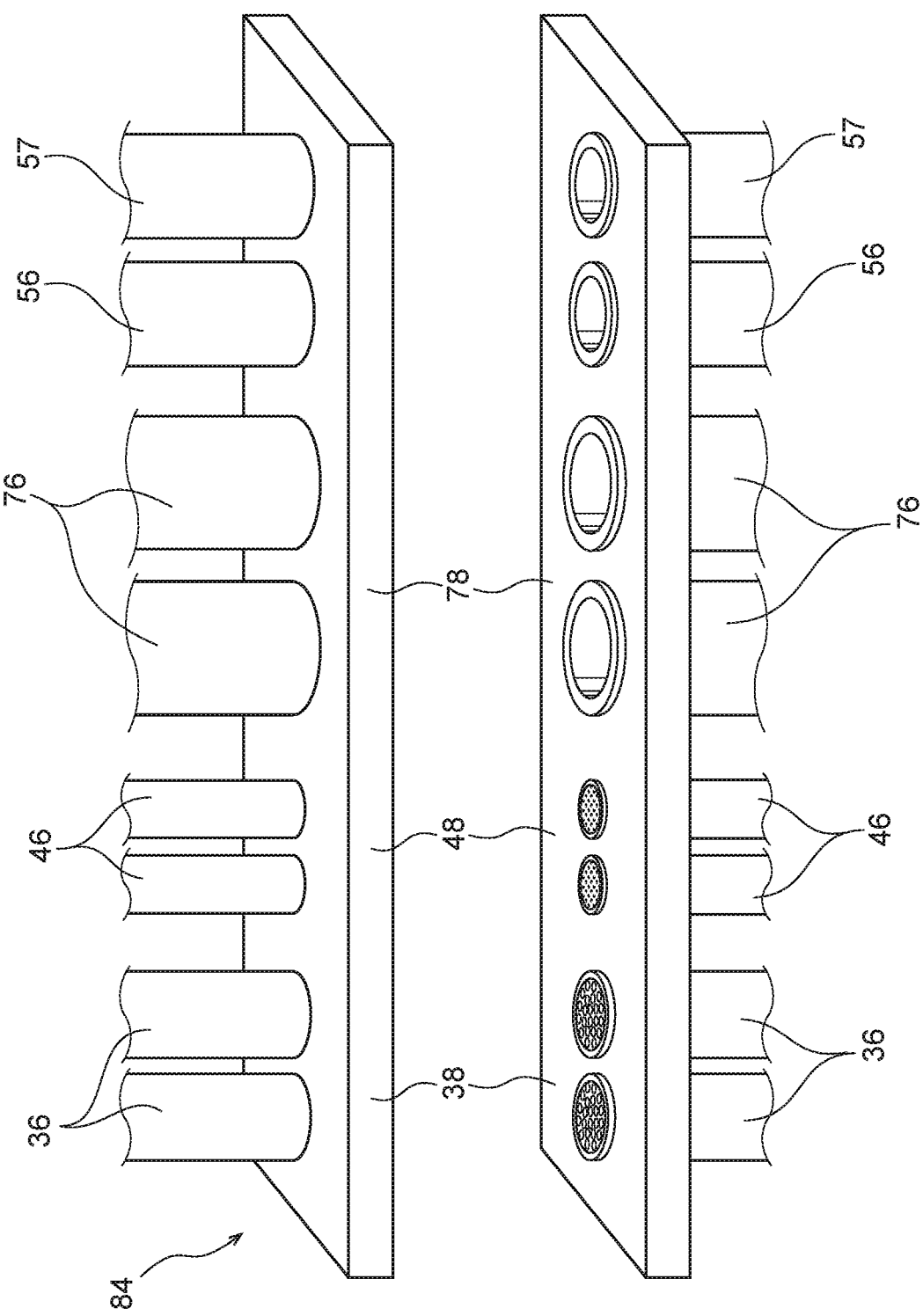

VEHICLE STRUCTURE OF ELECTRIC AUTOMOBILE

CROSS-REFERENCE TO RELATED APPLICATION

This application is based on and claims priority under 35 USC 119 from Japanese Patent Application No. 2018-154934 filed on Aug. 21, 2018, the disclosure of which is incorporated by reference herein.

BACKGROUND

Technical Field

The present disclosure relates to a vehicle structure of an electric automobile at which autonomous driving is possible.

Related Art

U.S. Patent Application Publication No. 2016/0207418 discloses an electric automobile that includes a frame assembly. The frame assembly includes a front frame, a middle frame and a rear frame. The middle frame can be replaced with other middle frames in order to change the length of the vehicle.

Here, when adapting electric automobiles to autonomous driving, devices and sensors relating to autonomous driving must be additionally installed in the vehicle. There is room for improvement in the accommodated positions of equipment and in the routing of wires in order to autonomous driving of the electric automobile of U.S. Patent Application Publication No. 2016/0207418.

SUMMARY

An object of the present disclosure is to provide, for electric automobiles at which autonomous driving is possible, a vehicle structure that can make the manufacturing of plural types of vehicles of different lengths easy.

A vehicle structure of an electric automobile of a first aspect has: a center module having a battery that is accommodated beneath a floor of a vehicle cabin; a front module that is joined to a vehicle front side of the center module; a rear module that is joined to a vehicle rear side of the center module; a driving unit that is provided at one of the front module or the rear module, and that is connected to the battery; and a control unit that is provided at another of the front module or the rear module, and that controls autonomous driving of the vehicle.

The vehicle structure of an electric automobile of the first aspect is applied to a vehicle that is manufactured by combining plural modules. In this vehicle, the driving unit and the control unit for autonomous driving are disposed so as to be divided between the front module and the rear module. On the other hand, because there are degrees of freedom in the accommodated position and the accommodated shape of the battery, correspondence with center modules of different lengths can be achieved. In accordance with the vehicle structure of the first embodiment, the length of an electric automobile at which autonomous driving is possible can be changed. Namely, plural types of vehicle having different lengths can be manufactured easily.

A vehicle structure of an electric automobile of a second aspect further has: plural sensors that are provided at a vehicle front side and a vehicle rear side, and that acquire a situation at a periphery of the vehicle; and a wire that extends from the control unit toward a vehicle upper side at the other module and that extends toward the one module at a vehicle upper portion in order to connect the control unit and the respective sensors.

In the vehicle structure of an electric automobile of the second aspect, the control unit that is the autonomous driving control system, and the sensors and the wire are set apart from motive power parts through which high-voltage electric current flows. Namely, influence of electromagnetic noise, generated from the motive power parts, on the autonomous driving control system can be reduced.

A vehicle structure of an electric automobile of a third aspect further has a connector that connects the battery and the driving unit at a joined portion of the center module and the rear module.

In accordance with the vehicle structure of an electric automobile of the third aspect, a reduction in the number of processes and an improvement in the efficiency of production can be devised when manufacturing vehicles of different sizes.

In accordance with the present disclosure, for electric automobiles at which autonomous driving is possible, plural types of vehicles of different lengths can be manufactured easily.

BRIEF DESCRIPTION OF THE DRAWINGS

Exemplary embodiments of the present disclosure will be described in detail based on the following figures, wherein:

FIG. 6 is a side view of an electric automobile relating to modified example 2 of the first embodiment;

FIG. 16 is a modified example of the fifth embodiment, and is a perspective view of an aggregate connector.

DETAILED DESCRIPTION

Electric automobiles relating to embodiments of the present disclosure are described by using the drawings. Note that, in the respective drawings, arrow FR indicates the vehicle front side, arrow UP indicates the vehicle upper side, arrow LH indicates the vehicle transverse direction left side, and arrow RH indicates the vehicle transverse direction right side.

First Embodiment (Structure)

Figure 1:
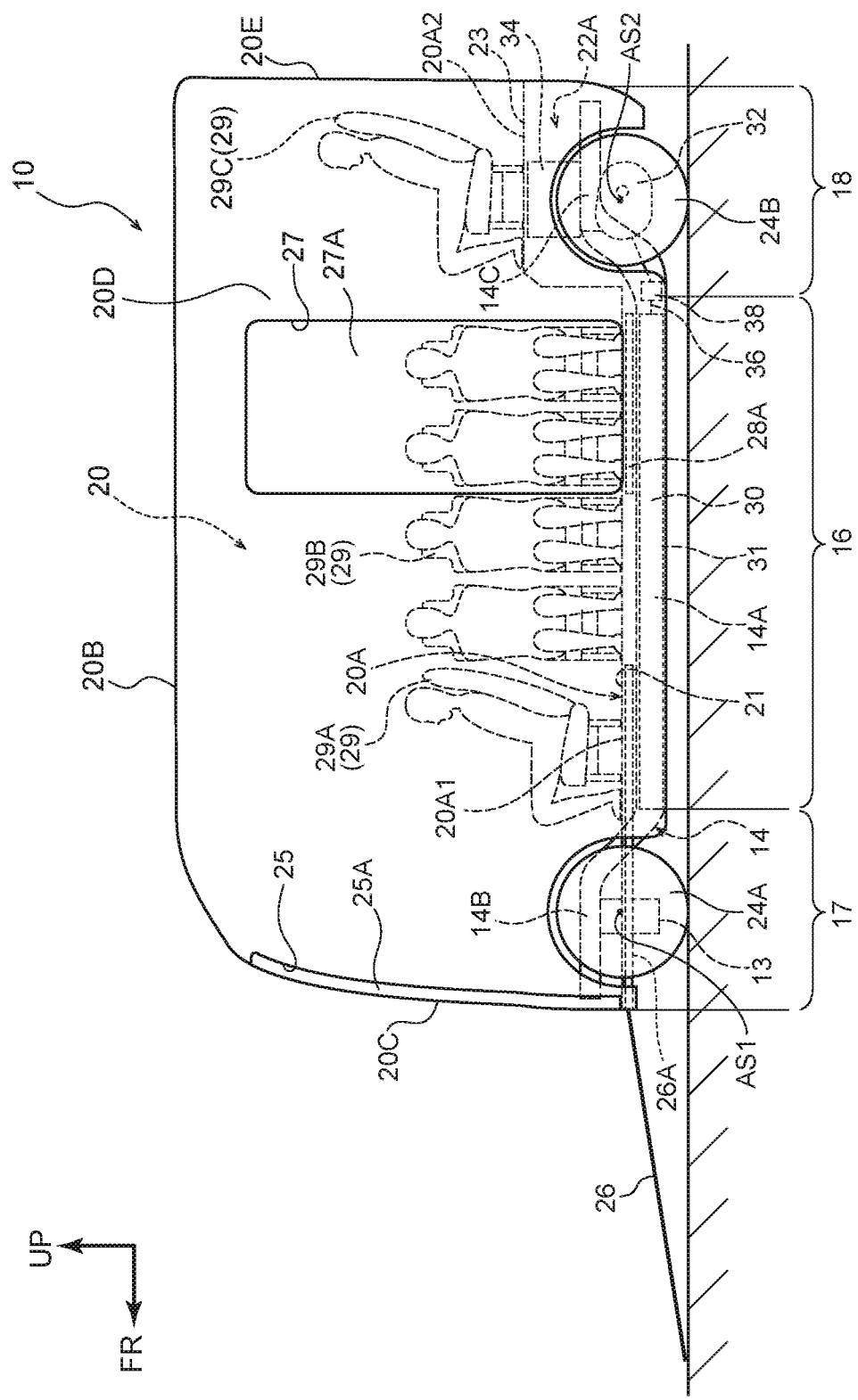
FIG. 1 is a side view of an electric automobile relating to a first embodiment.
Figure 2:
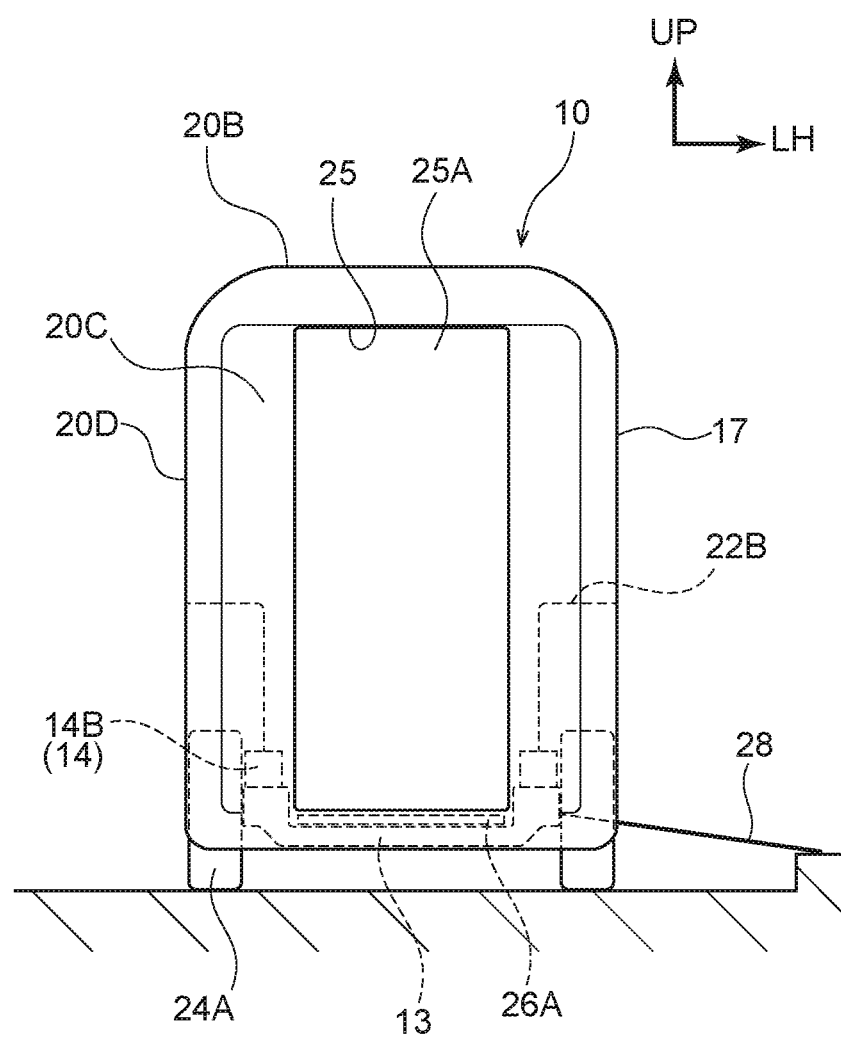
FIG. 2 is a front view of the electric automobile relating to the first embodiment.

A vehicle 10 of the present embodiment is an electric automobile at which completely autonomous driving is possible. As shown in FIG. 1 and FIG. 2, the exterior of the vehicle 10 is a substantially rectangular parallelepiped shape that is enclosed by a roof 20B, a front wall portion 20C, side wall portions 20D and a rear wall portion 20E. Front wheels 24A are provided at the vehicle front side, and rear wheels 24B are provided at the vehicle rear side. The front wall portion 20C and the rear wall portion 20E respectively are examples of front and rear wall portions.

Figure 3:
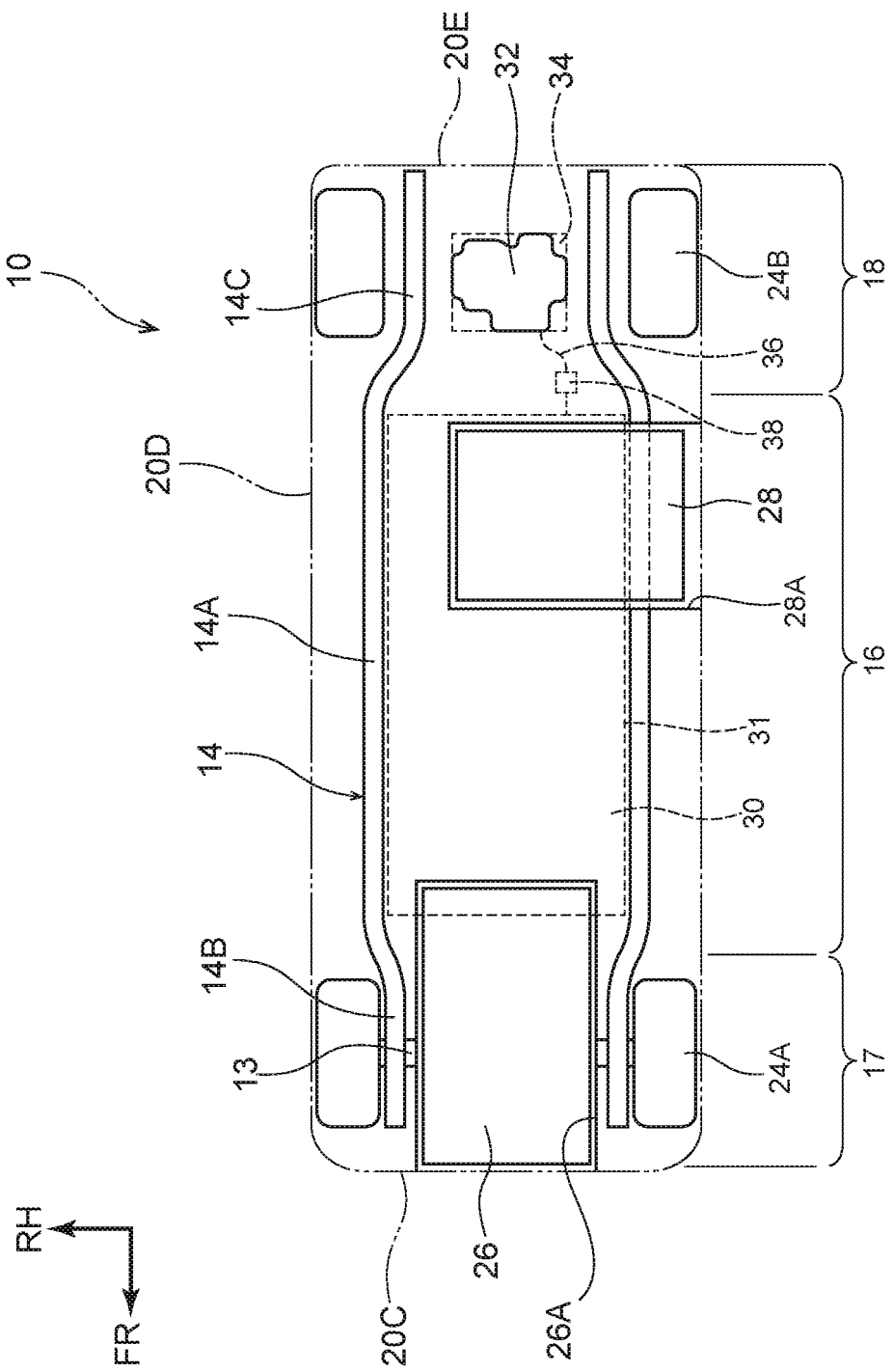
FIG. 3 is a plan sectional view of the electric automobile relating to the first embodiment.

The vehicle 10 of the present embodiment is structured by plural modules being joined together. As shown in FIG. 1 and FIG. 3, the vehicle 10 is structured to include a center module 16 that structures the vehicle longitudinal direction central portion, a front module 17 that is joined to the vehicle front side of the center module 16, and a rear module 18 that is joined to the vehicle rear side of the center module 16. The front module 17 and the center module 16 are divided with the border therebetween being a portion that is slightly toward the vehicle rear side of the front wheels 24A. The center module 16 and the rear module 18 are divided with the border therebetween being a portion that is slightly toward the vehicle front side of the rear wheels 24B. Here, in the following description, in the longitudinal direction direction of the vehicle 10, the portion where the front module 17 exists is considered to be the vehicle front portion, the portion where the center module 16 exists is considered to be the vehicle central portion, and the portion where the rear module 18 exists is considered to be the vehicle rear portion (the same holds for the other embodiments as well).

Note that the center module 16, the front module 17 and the rear module 18 may respectively be modules that structure only the vehicle lower side. The vehicle 10 in this case is formed by further joining a roof module that structures the vehicle upper side to the center module 16, the front module 17 and the rear module 18 that are joined together.

The center module 16 is structured to include the vehicle longitudinal direction central portions of the side wall portions 20D, and a battery case 31. Note that, in the present embodiment, plural types of center modules 16 having different lengths in the vehicle longitudinal direction are readied.

Figure 4:
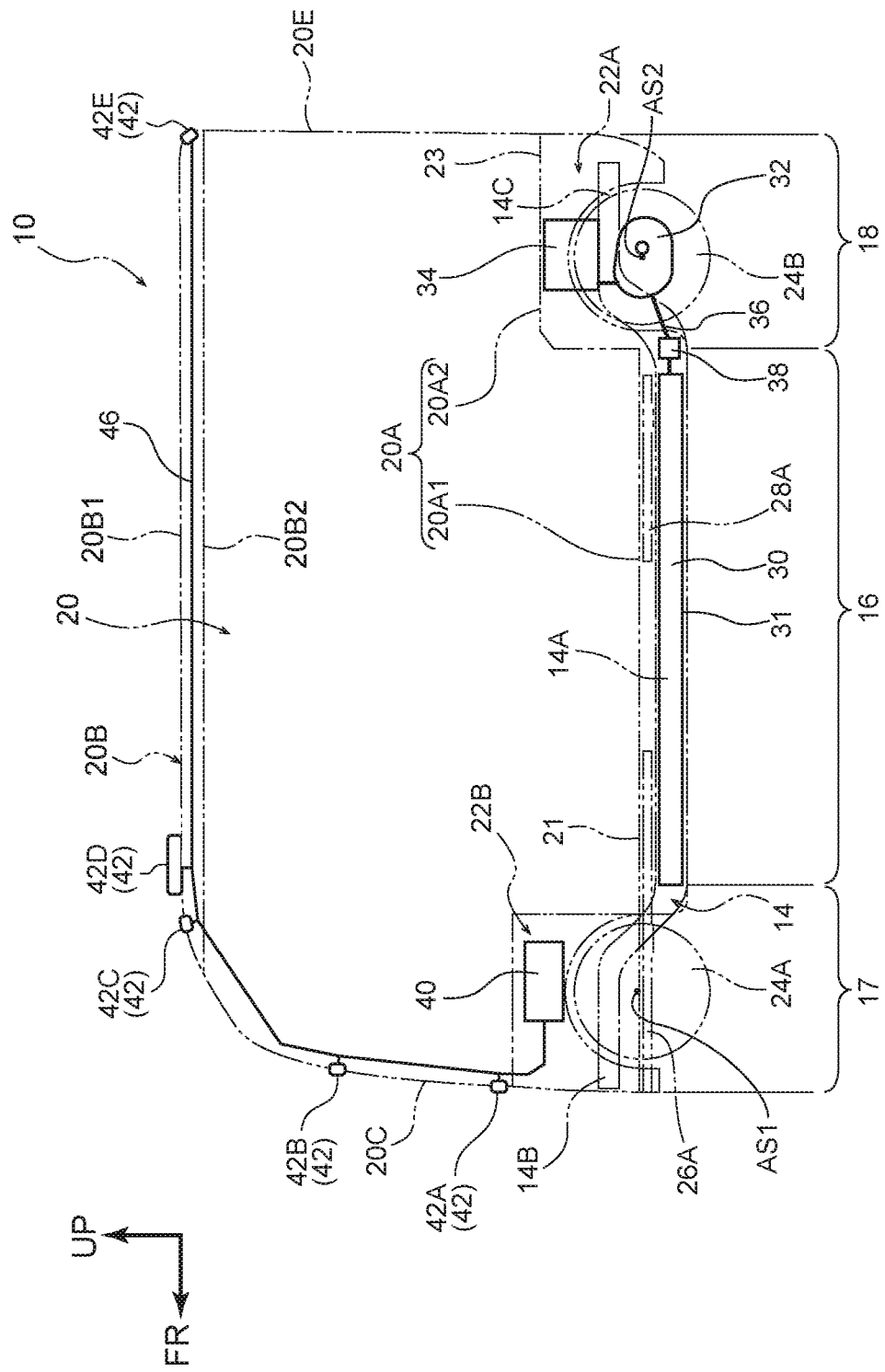
FIG. 4 is a side sectional view of the electric automobile relating to the first embodiment, and is a drawing explaining devices relating to autonomous driving.

The front module 17 is structured to include the front wall portion 20C, the vehicle front portions of the side wall portions 20D, and an autonomous driving unit 40 (see FIG. 4).

The rear module 18 is structured to include the rear wall portion 20E, the vehicle rear portions of the side wall portions 20D, a driving unit 32, and a power unit 34.

A pair of side members 14 that extend in the vehicle longitudinal direction are provided at the vehicle lower portion of the vehicle 10. The side member 14 has a center side member 14A, which extends from the vehicle rear portion of the front wheel 24A to the vehicle front portion of the rear wheel 24B, and a front side member 14B that is bent toward the vehicle transverse direction inner side and the vehicle upper side from the center side member 14A, and thereafter, extends toward the vehicle front. Further, the side member 14 has a rear side member 14C that is bent toward the vehicle transverse direction inner side and the vehicle upper side from the center side member 14A, and thereafter, extends toward the vehicle rear. Note that the center side members 14A are provided at the center module 16, the front side members 14B are provided at the front module 17, and the rear side members 14C are provided at the rear module 18.

A front axle 13 that supports the front wheels 24A is fixed to the front side members 14B. The driving unit 32 for driving the rear wheels 24B is fixed to the rear side members 14C.

As shown in FIG. 1, the vehicle 10 has a power unit chamber 22A in which the driving unit 32 is housed, and a vehicle cabin 20 that is partitioned-off from the power unit chamber 22A by a dash panel 23. The power unit chamber 22A of the present embodiment is the portion at the vehicle lower side of the vehicle rear portion, and is provided as a space of a range that surrounds the rear wheels 24B as seen in a side view.

In addition to the driving unit 32, the power unit 34 that serves as a high-voltage part is housed in the power unit chamber 22A. At the driving unit 32, at least a motor for traveling and a transaxle are made into a unit. Further, at the power unit 34, at least a boost converter and an inverter are made into a unit. The power unit 34 is electrically connected by power cables 36 from a battery 30 that is described later. Note that a power connector 38 is provided at the power cables 36, at the joined portion of the center module 16 and the rear module 18.

The region, which is further toward the vehicle front side and the vehicle upper side than the power unit chamber 22A, is the vehicle cabin 20 that is a substantially rectangular parallelepiped space. At the vehicle cabin 20 of the present embodiment, a floor surface 20A is formed by a floor panel 21 that is flat and is provided at the vehicle front portion and the vehicle central portion, and the dash panel 23 that is provided at the vehicle rear portion and surrounds the power unit chamber 22A. Namely, the floor surface 20A has a low floor portion 20A1 that is formed by the floor panel 21, and a high floor portion 20A2 that is formed by the dash panel 23 and that is at a position higher than the floor panel 21.

Further, as shown in FIG. 2, the vehicle cabin 20 has a protruding portion 22B that protrudes-out toward the vehicle transverse direction inner sides at the vehicle front portion of the vehicle cabin 20. This protruding portion 22B structures portions of the wheel houses that accommodate the front wheels 24A. The autonomous driving unit 40 that serves as a control unit is housed in a space that is adjacent to a wheel house (see FIG. 4). The autonomous driving unit 40 is structured to include an autonomous driving ECU that controls the autonomous driving of the vehicle 10, an interface ECU that controls the communication between the steering unit and the acceleration/deceleration unit, and the like. As shown in FIG. 4, plural sensors 42 that acquire the situation at the periphery of the vehicle 10 are connected to the autonomous driving unit 40. These sensors 42 include cameras that capture images of predetermined ranges, millimeter wave radar that transmits survey waves over a predetermined range, and LIDAR (Light Detection and Ranging/Laser Imaging Detection and Ranging) that scans a predetermined range. Note that a front entrance/exit 25 and a side entrance/exit 27 are omitted from FIG. 4.

The sensors 42 include front portion sensors 42A, 42B that are provided at the front surface of the vehicle 10, upper portion sensors 42C, 42D that are provided at the upper surface of the roof 20B at the vehicle front side portion, and a rear portion sensor 42E that is provided at the end portion of the roof 20B at the vehicle rear side. The respective sensors 42 and the autonomous driving unit 40 are connected by signal cables 46 that serve as a wire. Note that a camera is disposed at at least one of the front portion sensors 42A, 42B that are at the vehicle front side and the upper portion sensor 42C, in order to identify the statuses of traffic lights that are on the traveling route. For example, the front portion sensor 42B is a camera.

The signal cables 46, which extend from the autonomous driving unit 40 toward the vehicle upper side, are, midway therealong, connected to the front portion sensors 42A, 42B and the upper portion sensor 42C, and thereafter, are connected to the upper portion sensor 42D. The signal cables 46 extend from the upper portion sensor 42D toward the vehicle rear side and are connected to the rear portion sensor 42E. Here, at the roof 20B side, the signal cables 46 are disposed along the vehicle longitudinal direction between a roof panel 20B1 and an interior material 20B2 that structure the roof 20B.

As described above, in the vehicle cabin 20 of the present embodiment, the low floor portion 20A1, whose vehicle front side from the power unit chamber 22A is a flat floor surface formed by the flat floor panel 21, is formed. As shown in FIG. 1, the low floor portion 20A1 is positioned further toward the vehicle lower side than axle AS1 of the front wheels 24A and axle AS2 of the rear wheels 24B. The vehicle cabin 20 is formed at a height at which the passengers can board the vehicle 10 while standing-up. Here, a dummy having the physique of a standard (average) adult, e.g., an AM 50 (50th percentile U.S. adult male) internationally standardized side crash dummy (World Side Impact Dummy: World SID), can be used as an example of the "passenger". Namely, the vehicle cabin 20 of the present embodiment has a height that is such that there is a clearance between the roof 20B and the head portion of an AM 50 dummy when the AM 50 dummy is in a standing state. Note that the example of the passenger is not limited to an AM 50 dummy, and can be another crash dummy or a model of a standard physique that is obtained statistically.

Further, plural seats 29 in which passengers can sit are provided in the vehicle cabin 20. The seats 29 of the present embodiment are one front row seat 29A that is set at the vehicle front of the vehicle cabin 20, plural middle row seats 29B that are set so as to be lined up at the vehicle rear side of the front row seat 29A, and one rear row seat 29C that is set at the upper portion of the power unit chamber 22A. The front row seat 29A and the middle row seats 29B are fixed to the floor panel 21, and the rear row seat 29C is fixed to the dash panel 23. The front row seat 29A and the rear row seat 29C are set such that the passengers seated therein face toward the vehicle front side. Further, at least four of the middle row seats 29B are disposed at the vehicle transverse direction right side. The middle row seats 29B are set such that the passengers who are seated therein face toward the vehicle transverse direction left side. However, the present disclosure is not limited to this, and the middle row seats 29B may be set such that the passengers face toward the vehicle front side. Moreover, the respective seats 29 may be made able to rotate freely with the vehicle vertical direction being the axes of rotation.

The battery 30 is accommodated beneath the floor of the vehicle cabin 20, and concretely, at the vehicle lower side of the floor panel 21 at the vehicle central portion. In further detail, the battery 30 is provided between the pair of center side members 14A that are disposed at the vehicle central portion, and is housed in the battery case 31 that is fixed to the center side members 14A.

The front entrance/exit 25, which is an end portion entrance/exit of a size through which adult passengers can walk and enter into and exit from the vehicle, is provided in the front wall portion 20C that is at the vehicle front side of the vehicle cabin 20. This front entrance/exit 25 is closed-off by a hinged door 25A whose vehicle transverse direction one end is fixed so as to be able to rotate. Further, a front ramp 26, which serves as an end portion ramp and extends at a downward incline from the low floor portion 20A1 toward the roadway, is provided at the front entrance/exit 25. When the vehicle 10 is traveling, the front ramp 26 is accommodated in a front accommodating portion 26A that is provided at the lower portion of the floor panel 21 (see FIG. 3). In the state of usage in which passengers are entering into or exiting from the vehicle 10 thereon, the front ramp 26 is pulled-out toward the front of the vehicle from the front accommodating portion 26A.

The side entrance/exit 27 of a size through which adult passengers can walk and enter into and exit from the vehicle 10 is provided in the side wall portion 20D that is at a vehicle side (the vehicle transverse direction left side) of the vehicle cabin 20. This side entrance/exit 27 is closed-off by a sliding door 27A that is slidably fixed to the vehicle front side. Further, as shown in FIG. 2, a side ramp 28, which extends at a downward incline from the low floor portion 20A1 toward the sidewalk (or the roadway), is provided at the side entrance/exit 27. When the vehicle 10 is traveling, the side ramp 28 is accommodated in a side accommodating portion 28A that is provided in the gap between the floor panel 21 and the battery case 31 (see FIG. 3). In the state of usage in which passengers are entering into or exiting from the vehicle 10 thereon, the side ramp 28 is pulled-out toward the side of the vehicle from the side accommodating portion 28A.

As shown in FIG. 3, as seen in a plan view, the side accommodating portion 28A is formed at position that does not overlap the front accommodating portion 26A and is apart from the front accommodating portion 26A. Namely, as seen in a plan view, the side ramp 28 does not overlap the front ramp 26, and is accommodated at a position removed therefrom.

(Manufacturing Method)

In the present embodiment, first, the center module 16, the front module 17 and the rear module 18 are respectively manufactured. For example, at the center module 16, the roof 20B at the vehicle central portion, the side wall portions 20D at the vehicle central portion, the floor panel 21 at the vehicle central portion, and the center side members 14A and the like are assembled together. Further, the battery case 31 is fixed to the center side members 14A.

At the front module 17, the front wall portion 20C, the roof 20B at the vehicle front portion, the side wall portions 20D at the vehicle front portion, the floor panel 21 at the vehicle front portion, the front side members 14B, and the front wheels 24A and the like are assembled together. The autonomous driving unit 40 is fixed to the interior of the projecting portion 22B. Moreover, at the rear module 18, the rear wall portion 20E, the roof 20B at the vehicle rear portion, the side wall portions 20D at the vehicle rear portion, the rear side members 14C, the dash panel 23, and the rear wheels 24B and the like are assembled together. Further, the driving unit 32 and the power unit 34 are fixed to the power unit chamber 22A.

Then, the front module 17 and the rear module 18 are joined to the center module 16. At the time of joining the respective modules, the autonomous driving unit 40 and the respective sensors 42 are connected by the signal cables 46. Further, the battery 30 and the power unit 34 are connected by the power cables 36. Namely, the battery 30 and the driving unit 32 are electrically connected.

(Modified Example of First Embodiment)

Figure 5:
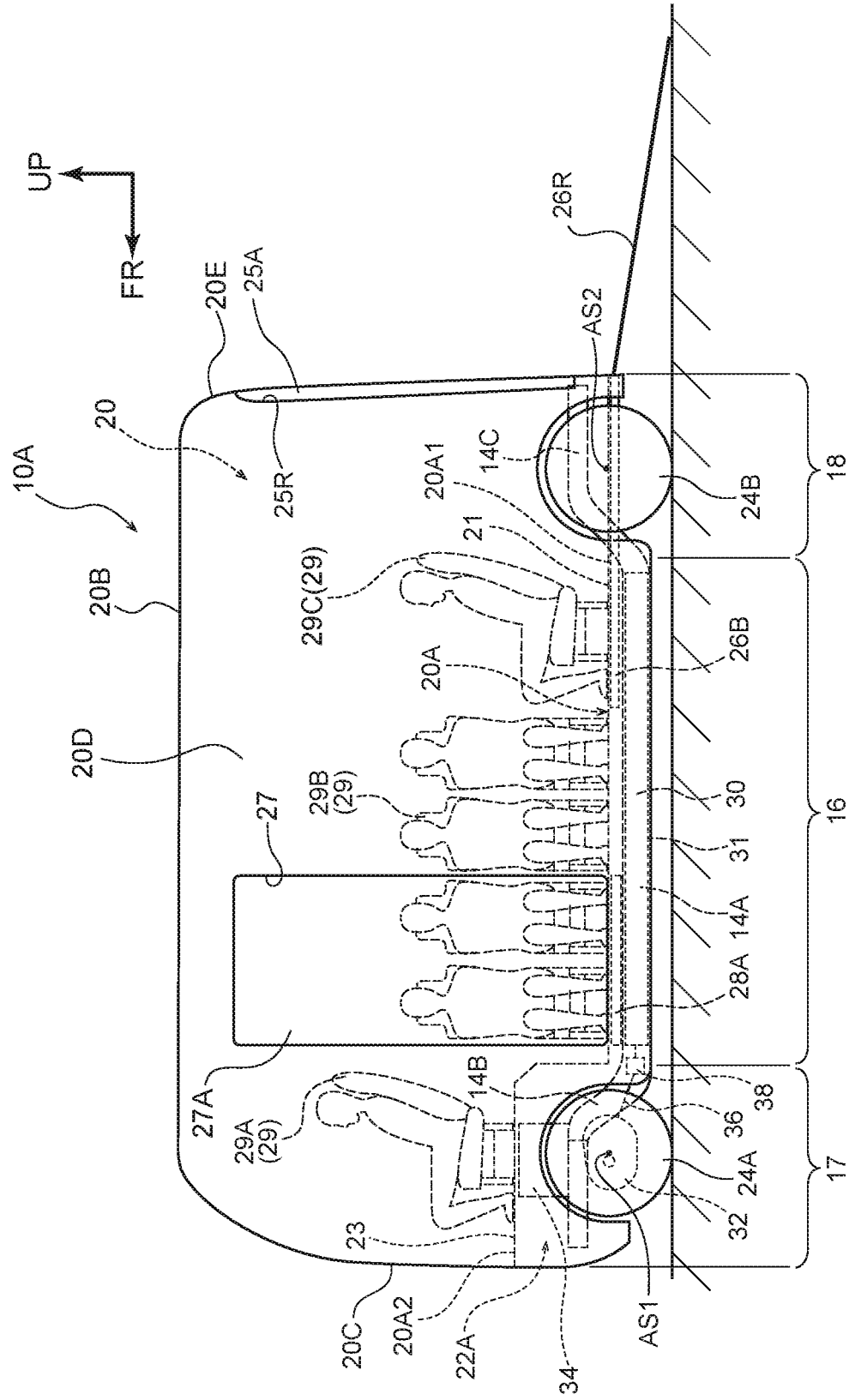
FIG. 5 is a side view of an electric automobile relating to modified example 1 of the first embodiment.

Note that, at the vehicle 10 of the present embodiment, the front entrance/exit 25 is provided at the vehicle front side as an end portion entrance/exit, and the driving unit 32 is provided at the vehicle rear side. However, the positions of the end portion entrance/exit and the driving unit 32 may be reversed front and rear. For example, as shown in FIG. 5, in a vehicle 10A of modified example 1 of the present embodiment, the driving unit 32 is provided at the vehicle front side, and a rear entrance/exit 25R is provided at the vehicle rear side as an end portion entrance/exit. This rear entrance/exit 25R is closed-off by the hinged door 25A whose vehicle transverse direction one end is fixed so as to be able to rotate. Further, a rear ramp 26R, which serves as an end portion ramp and extends at a downward incline from the low floor portion 20A1 toward the roadway, is provided at the rear entrance/exit 25R. When the vehicle 10 is traveling, the rear ramp 26R is accommodated in a rear accommodating portion 26B that is provided at the lower portion of the floor panel 21. In the state of usage in which passengers are entering into or exiting from the vehicle 10A thereon, the rear ramp 26R is pulled-out toward the rear of the vehicle from the rear accommodating portion 26B. Operation and effects that are similar to those of the present embodiment are achieved in the case of modified example 1 as well.

The vehicle 10 of the present embodiment is structured by the plural modules being joined together. The size of the vehicle 10 and the area of the vehicle cabin 20 can be changed by changing the length of the center module 16 that is at the vehicle central portion. For example, as shown in FIG. 6, in a vehicle 10B of modified example 2 of the present embodiment, the center module 16 is shortened, and the vehicle longitudinal direction length thereof is formed to be short as compared with in the vehicle 10 of the present embodiment. In the vehicle 10B of modified example 2, the front row seat 29A is omitted due to the vehicle longitudinal direction length of the vehicle cabin 20 being shortened. Note that the front entrance/exit 25 and the side entrance/exit 27 are omitted from FIG. 6 (the same holds for the drawings that are described hereinafter).

In modified example 2, the battery 30 and the driving unit 32 (the power unit 34) are electrically connected due to the power cables 36 being connected via the power connector 38 at the joined portion of the center module 16 and the rear module 18. Therefore, even if the center module 16 is lengthened or shortened, the same rear module 18 can be joined thereto. Namely, in accordance with the present embodiment and modified example 2 thereof, when manufacturing vehicles of different sizes, the same battery 30 and driving unit 32 and the like can be used regardless of the size, and therefore, an increase in the manufacturing cost can be suppressed.

Figure 7A:
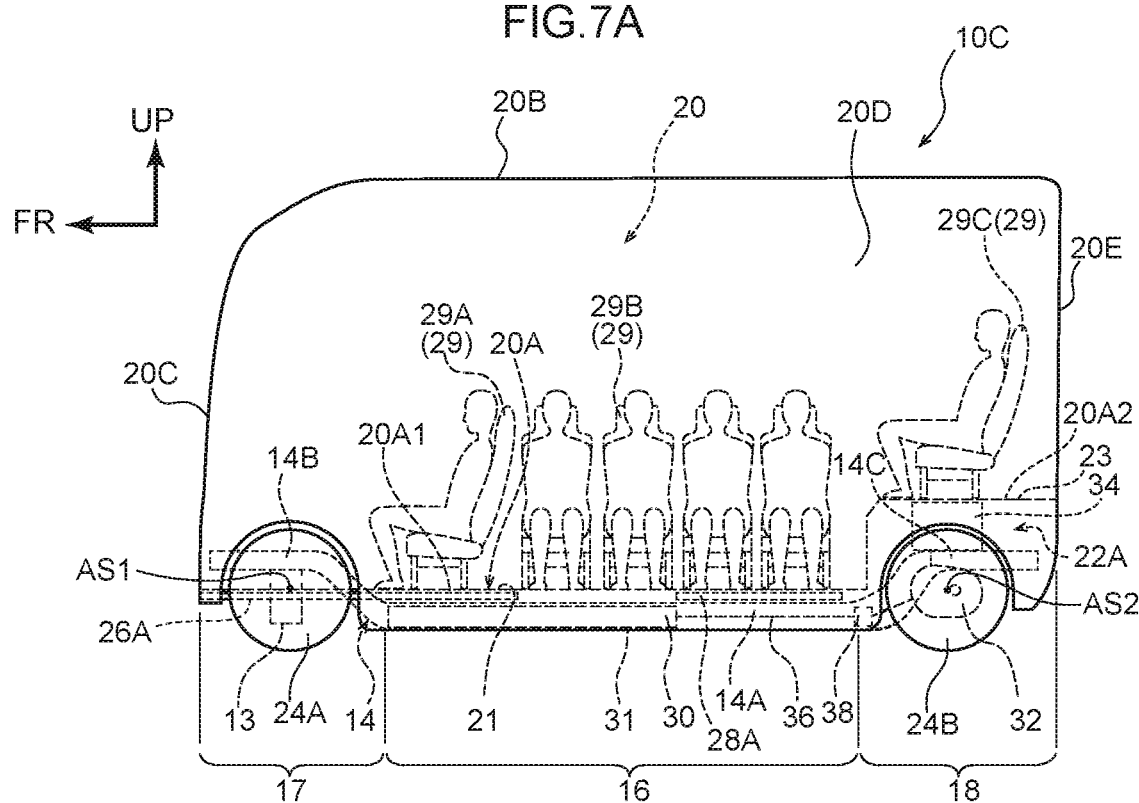
FIG. 7A is a side sectional view that explains the placement of a battery relating to modified example 3 of the first embodiment.

Note that there is no need for the battery case 31 (the battery 30) to be set over the entire vehicle central portion region. FIG. 7A illustrates, as modified example 3 of the present embodiment, a vehicle 10C in which the battery case 31, whose vehicle longitudinal direction length is shorter than that of the center module 16, is disposed toward the vehicle front side. By changing the accommodated position of the battery case 31 that is set beneath the floor of the vehicle cabin 20 such as in modified example 3, the center of gravity position of the vehicle 10 can be adjusted. For example, the battery 30 that is beneath the floor of the vehicle cabin 20 can be disposed toward the vehicle front side, in consideration of the weight of the driving unit 32 that is at the vehicle rear portion. Due thereto, the same batteries 30 and driving units 32 and the like can be used regardless of the size of the vehicle, and stable traveling can be realized.

Figure 7B:
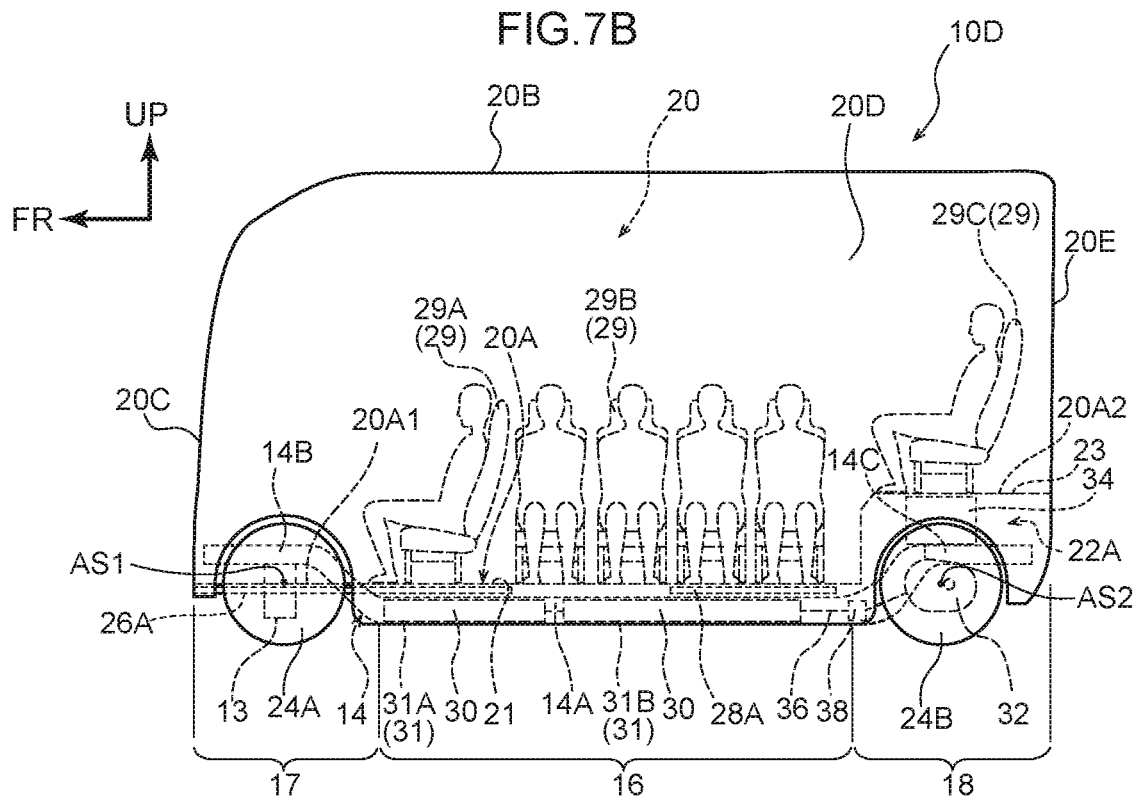
FIG. 7B is a side sectional view that explains the placement of the battery relating to modified example 4 of the first embodiment.

The battery case 31 (the battery 30) that is disposed beneath the floor of the vehicle cabin 20 may be divided into plural parts. FIG. 7B illustrates, as modified example 4 of the present embodiment, vehicle 10D in which the battery case 31 is divided into two parts that are a front part and a rear part. Further, if the battery cases 31 of predetermined lengths are readied, there is no need to prepare many kinds of battery cases 31 that are formed so as to accord with lengths of the center modules 16. For example, in the vehicle 10D of FIG. 7B, battery case 31A of twice the standard length and battery case 31B that is three times the standard length are combined. In contrast, correspondence with the length of the center module 16 can be achieved by combining two of the battery cases 31A in a case in which the center module 16 is shortened, or by combining two of the battery cases 31B in a case in which the center module 16 is extended. Further, for example, in a case of using the battery cases 31 of a single size, if the center module 16 is extended, the number of the battery cases 31 of a predetermined length that are lined-up in the vehicle longitudinal direction is increased, and, if the center module 16 is shortened, the number of the battery cases 31 of the predetermined length that are lined-up in the vehicle longitudinal direction is decreased. Due thereto, inventory costs can be reduced because it is possible to address center modules 16 of different lengths by one type of the battery case 31.

(Overview of First Embodiment)

In the vehicle 10 of the present embodiment, the driving unit 32 is disposed toward the vehicle lower side of the vehicle rear portion, and the front entrance/exit 25 is provided at the front wall portion 20C that is at the vehicle front side. Due thereto, the vehicle cabin 20 is formed from the vehicle front end portion to the vehicle rear end portion. Here, because the front axle 13 is disposed beneath the floor in a vicinity of the front wheels 24A at the vehicle front portion, the low floor portion 20A1 cannot be made to be lower than the front axle 13. On the other hand, at the vehicle central portion, although it is possible to make the floor lower than at the vehicle front portion, in this case, a step arises at the low floor portion 20A1.

Thus, in the vehicle 10 of the present embodiment, the height of the low floor portion 20A1 at the vehicle central portion side is made to accord with the height at the vehicle front portion side, and the battery 30 is accommodated beneath the low floor portion 20A1 at the vehicle central portion where there is leeway in the height. Namely, at the vehicle central portion, by placing the center side members 14A that are frame members and the battery 30 beneath the low floor portion 20A1, the floor surface 20A is formed whose top surface is a flat from the front entrance/exit 25 to the power unit chamber 22A. Further, the space of the vehicle cabin 20 is ensured due to the battery 30 being housed beneath the low floor portion 20A1.

As described above, in accordance with the present embodiment, the space that is occupied by the vehicle cabin 20 in the vehicle 10 that is box-shaped can be maximized, while the surface area of the low floor portion 20A1 can be ensured to be the maximum. Further, in the vehicle cabin 20 of the present embodiment, adult passengers can assume standing postures, and can walk around. Because the vehicle 10 of the present embodiment is a completely autonomous-driving vehicle, it is not absolutely necessary to provide a driver's seat, and the layout of the vehicle cabin 20 interior can be set freely. Namely, in accordance with the present embodiment, equipment corresponding to applications such as ride sharing, lodging, restaurants, retail shops and the like can be accommodated in a flat and wide space that is due to the low-floor, box-shaped, barrier-free design. Further, the vehicle 10 of the present embodiment is suitable as a autonomous-driving bus.

Further, the vehicle 10 of the present embodiment can be accessed from the roadway due to the front entrance/exit 25 being provided at the vehicle front side, and, in addition to the roadway, can be accessed from the sidewalk due to the side entrance/exit 27 being provided at the vehicle side.

At the front entrance/exit 25, the front ramp 26 can be provided from the low floor portion 20A1 toward the roadway. Further, at the side entrance/exit 27, the side ramp 28 can be provided from the low floor portion 20A1 toward the sidewalk. Namely, in accordance with the present embodiment, by eliminating the step between the road surface and the floor surface of the vehicle cabin, entry and exit while in a wheelchair, and the work of loading and unloading luggage and dollies, can be carried out easily. In particular, in the present embodiment, due to the entrances/exits being provided at two places which are at the front surface and a side surface of the vehicle 10, entry and exit while in a wheelchair, and the work of loading and unloading luggage and dollies, can be carried out easily on the roads that the vehicle 10 can pass along, regardless of the absence/presence of sidewalks that have a step. Note that elevators may be set at the front entrance/exit 25 and the side entrance/exit 27 instead of the ramps.

In the present embodiment, as seen in a plan view, the front ramp 26 and the side ramp 28 are accommodated at positions that do not overlap, in states of being apart from one another. Here, if the front ramp 26 and the side ramp 28 were to be accommodated at positions that overlap as seen in a plan view, there would be the need to raise the low floor portion 20A1, or to reduce the vehicle vertical direction heights of the battery case 31 that houses the battery 30 and of the center side members 14A. In contrast, in accordance with the vehicle 10 of the present embodiment, because the side ramp 28 is accommodated at a position that does not overlap the front ramp 26 and in a state of being apart therefrom as seen in a plan view, lowering of the low floor portion 20A1 and increasing of the volume of the battery 30 can both be realized.

Further, in the vehicle 10 of the present embodiment, the autonomous driving unit 40 and the respective sensors 42 are disposed at the vehicle front portion and the vehicle upper portion, and the battery 30, the power cables 36, the power unit 34 and the driving unit 32 are disposed at the vehicle lower sides of the vehicle central portion and the vehicle rear portion. Namely, in the present embodiment, the autonomous driving unit 40 and the sensors 42 that relate to autonomous driving are disposed so as to be set apart from the battery 30, the power cables 36, the power unit 34 and the driving unit 32 that are motive power parts through which high-voltage current flows. In accordance with the present embodiment, influence of electromagnetic noise, generated from the motive power parts, on the autonomous driving unit 40 and the sensors 42 can be reduced.

Further, the signal cables 46 that connect the autonomous driving unit 40 and the respective sensors 42 are disposed from the vehicle front side to the vehicle upper side, and the signal cables 46 also are set so as to be apart from the motive power parts. Namely, in accordance with the present embodiment, by setting the signal cables 46, which are easily affected by noise, far apart from the motive power parts, influence of electromagnetic noise, generated from the motive power parts, on the control signals of the autonomous driving can be reduced.

The vehicle 10 of the present embodiment is manufactured by combining plural modules. In the vehicle 10 of the present embodiment, the driving unit 32 and the autonomous driving unit 40 are disposed so as to be divided between the front module 17 and the rear module 18. On the other hand, because there are degrees of freedom in the accommodated position and the accommodated shape of the battery 30, correspondence with the center modules 16 that have different lengths can be achieved. In the present embodiment, for example, the manufacturing of vehicles of different sizes can be addressed by readying plural types of center modules for one type of front module and rear module. Concretely, as in above-described modified example 2, by preparing the center modules 16 that have different lengths in the vehicle longitudinal direction for the front module 17 and the rear module 18 that are the same of those of the present embodiment, it is possible to change the sizes of vehicles.

As described above, in accordance with the vehicle structure of the vehicle 10 of the present embodiment, the length of an electric automobile at which autonomous driving is possible can be changed. Namely, plural types of vehicles having different lengths can be manufactured easily. Further, in accordance with the present embodiment, the power connector 38, which electrically connects the battery 30 and the driving unit 32, is provided at the joined portion of the center module 16 and the rear module 18. Therefore, a reduction in the number of processes and an improvement in the efficiency of production can be devised when manufacturing vehicles of different sizes.

Note that the manufacturing of vehicles of different sizes may also be addressed by fixing the length of the center module so as to make the center module be a common module, and preparing front modules or rear modules that have different vehicle longitudinal direction lengths.

Further, although the vehicle of the present embodiment is a vehicle that has been modularized, the manufacturing of vehicles of different sizes can easily be addressed also for vehicles that are manufactured by the assembling of parts and are not modularized. For example, the vehicles 10 of different vehicle longitudinal direction lengths can be easily manufactured by preparing the center side members 14A, the side wall portions 20D, the floor panels 21, the battery cases 31 and the like that have different length dimensions.

Second Embodiment

A vehicle 100 of a second embodiment differs from the first embodiment with regard to the point that, in addition to the driving unit 32 and the power unit 34, the autonomous driving unit 40 is disposed at the vehicle rear side of the vehicle 100. Description hereinafter centers around the points that differ from the first embodiment. Note that structures that are the same as those of the first embodiment are denoted by the same reference numerals.

Figure 8:
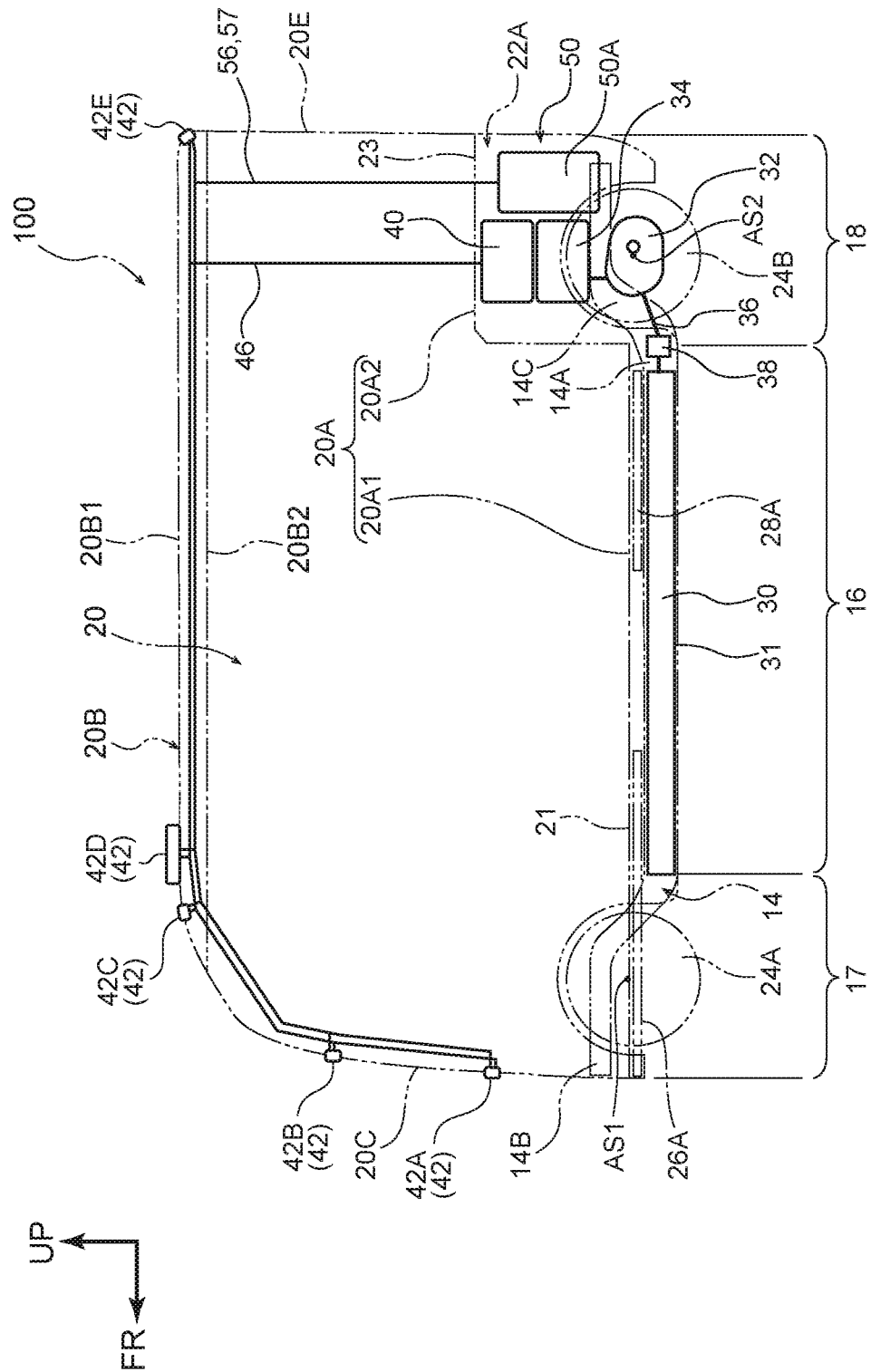
FIG. 8 is a side sectional view of an electric automobile relating to a second embodiment, and is a drawing explaining devices relating to autonomous driving.

As shown in FIG. 8, the driving unit 32, the power unit 34, the autonomous driving unit 40 and a main body portion 50A of a washing unit 50 are housed in the power unit chamber 22A of the vehicle 100 of the present embodiment.

In the present embodiment, due to the autonomous driving unit 40 being disposed at the vehicle rear side, the signal cables 46 that are connected from the autonomous driving unit 40 to the respective sensors 42 are disposed from the vehicle rear toward the vehicle front. Concretely, the signal cables 46 that extend from the autonomous driving unit 40 toward the vehicle upper side are first connected to the rear portion sensor 42E, and extend along the roof 20B toward the vehicle front side, and are connected to the upper portion sensor 42D. Moreover, the signal cables 46 are connected to the upper portion sensor 42C and the front portion sensors 42B, 42A.

The washing unit 50 is a device that maintains the autonomous driving performance by eliminating, by a washing liquid and compressed air, dirt that has adhered to the sensor surfaces of the sensors 42. The washing unit 50 has the main body portion 50A that includes a control section that controls the timing and the operation of the washing, and a reservoir tank that stores the washing liquid. Further, the washing unit 50 have a liquid pipe 56 that supplies the washing liquid from the main body portion 50A toward the respective sensors 42, and an air pipe 57 that supplies compressed air from the main body portion 50A toward the respective sensors 42. Even if the vehicle 100 does not have the washing unit 50, problems with autonomous driving do not arise right away. Therefore, the main body portion 50A that is accommodated in the power unit chamber 22A is not essential to the self-traveling of the vehicle 100, and is an accessory part that is independent from the control system that relates to traveling (i.e., the driving unit 32, the power unit 34, the autonomous driving unit 40).

Figure 9:
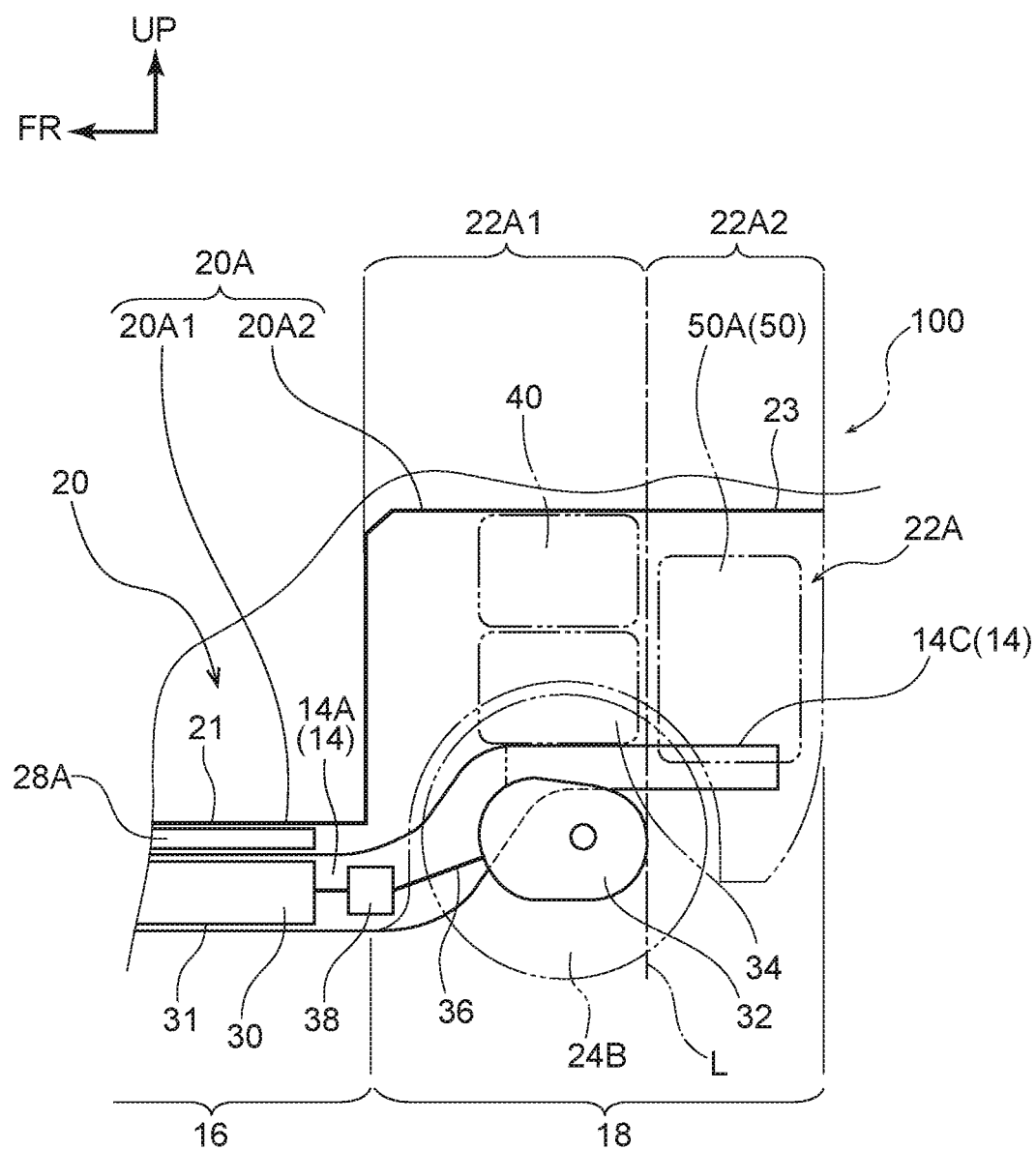
FIG. 9 is an enlarged view (an enlarged view of FIG. 8) of a power unit chamber of the second embodiment.

Here, as shown in FIG. 9, at the power unit chamber 22A of the present embodiment, the portion that is further toward the vehicle front side than the rear end portion (refer to straight line L of FIG. 9) of the driving unit 32 is a protected area 22A1. In addition to the driving unit 32, the power unit 34 and the autonomous driving unit 40 are disposed in the protected area 22A1. In a case in which the vehicle 100 that is traveling toward the vehicle rear side collides with an obstacle or the like, or in a case in which the vehicle 100 is collided with from the vehicle rear side, the driving unit 32 that has a metal case functions as an impact resistant portion that stops deformation of the vehicle 100.

Further, the portion of the power unit chamber 22A that is further toward the vehicle rear side than the rear end portion (refer to straight line L of FIG. 9) of the driving unit 32 is a crush area 22A2. The main body portion 50A is disposed in the crush area 22A2. In the present embodiment, by placing the main body portion 50A at the vehicle outer side and not at the vehicle cabin 20 side, the space of the vehicle cabin 20 can be ensured. Further, in a case in which the vehicle 100 that is traveling toward the vehicle rear side collides with an obstacle or the like, or in a case in which the vehicle 100 is collided with from the vehicle rear side, the impact that is applied to the vehicle 100 is absorbed by structural members of the crush area 22A2 such as the main body portion 50A and the like being crushed.

In the present embodiment, due to the power cables 36, the power unit 34 and the driving unit 32, which are motive power parts through which high-voltage current flows, being disposed in the protected area 22A1, even if the vehicle 100 collides or is collided with from the rear, safety with respect to electric leakage can be ensured. Further, the motive power parts are disposed in the protected area 22A1, and the main body portion 50A of the washing unit 50, which is not essential to self-traveling and is independent from the control system that relates to traveling, is disposed in the crush area 22A2. Due thereto, even if the vehicle 100 collides or is collided with from the rear, damage to the vehicle 100 can be kept to an extent such that self-traveling remains possible. Moreover, by placing the autonomous driving unit 40 in the protected area 22A1, even if there is a collision, traveling by autonomous driving of the vehicle 100 is possible. In accordance with the present embodiment, even if there is a collision, the vehicle 100, which does not need a driver's seat and is a completely autonomous-driving vehicle, can travel to a safe place in order to avoid further danger.

Figure 10:
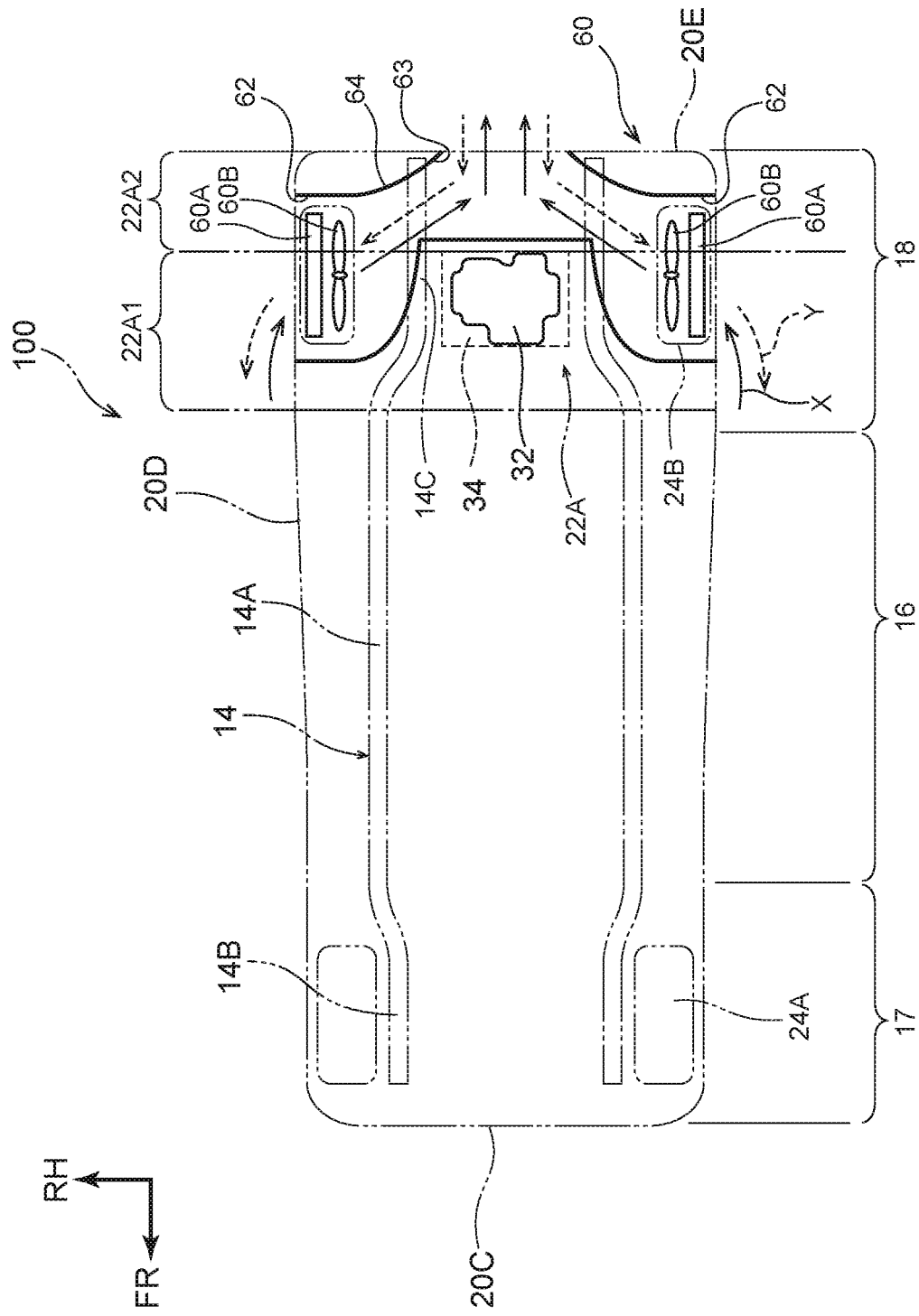
FIG. 10 is a plan sectional view of the electric automobile relating to the second embodiment, and is a drawing explaining a cooling device.

On the other hand, as shown in FIG. 10, a cooling device 60 for cooling the driving unit 32 and the like is disposed at the vehicle upper side of the power unit chamber 22A of the present embodiment. The vehicle 100 of the present embodiment has, as the cooling device 60, a pair of radiators 60A that are provided at the vehicle transverse direction both sides, and fans 60B for air blowing that are provided at the vehicle transverse direction inner sides of the radiators 60A.

Further, openings 62 are formed in the side wall portions 20D at the vehicle transverse direction outer sides of the radiators 60A, and a rear grill 63 that is an air vent is formed in the rear wall portion 20E that is at the vehicle rear side of the radiators 60A. A duct 64, which is for guiding air from the rear grill 63 to the openings 62 at the vehicle transverse direction both sides, is provided at the power unit chamber 22A.

In the present embodiment, by changing the rotating direction of the fan 60B, the direction of the air that flows through the duct 64 is controlled. For example, by rotating the fan 60B forward, the flow of air is in directions from the openings 62 toward the rear grill 63 (refer to solid line arrows X). Further, by rotating the fan 60B reversely, the flow of air is in directions from the rear grill 63 toward the openings 62 (refer to dashed line arrows Y).

By the way, the vehicle 100 of the present embodiment is a completely autonomous-driving vehicle, and a driver's seat is not absolutely necessary, and the advancing direction of the vehicle 100 can be made to be either of the vehicle front side direction and the vehicle rear side direction. In the present embodiment, in a case in which the vehicle 100 travels in the vehicle front side direction, due to air coming-out of the rear grill 63, traveling wind hits the radiators 60A. In a case in which the vehicle 100 travels in the vehicle rear side direction, due to air being introduced-in from the rear grill 63, traveling wind hits the radiators 60A. Namely, in accordance with the present embodiment, cooling by the cooling device 60 can be carried out whether the direction of traveling is the vehicle front side direction or the vehicle rear side direction. However, in the present embodiment, in order to ensure the cooling capacity regardless of the volume and the direction of the traveling wind, rotation of the fan 60B is changed in accordance with the advancing direction of the vehicle 100.

For example, in a case in which the advancing direction is the vehicle front side direction, by rotating the fan 60B forward, air is taken-in from the openings 62 that are at the vehicle lateral sides, and the radiators 60A are cooled, and air whose temperature has been raised by the heat exchange is exhausted-out from the rear grill 63 at the vehicle rear side (refer to the solid line arrows X). Further, in a case in which the advancing direction is the vehicle rear side direction, by rotating the fan 60B reversely, air is taken-in from the rear grill 63 that is at the vehicle rear side, and the radiators 60A are cooled, and the air whose temperature has been raised by the heat exchange is exhausted-out from the openings 62 at the vehicle lateral sides (refer to the dashed line arrows Y).

As described above, in accordance with the cooling device 60 of the present embodiment, at a vehicle 100 that does not have a driver's seat and at which there is no differentiation between advancing directions, cooling capacities that are equivalent when the vehicle is traveling in the vehicle front side direction or the vehicle rear side direction can be realized by radiators of the minimum extent necessary.

Note that, in the vehicle 100 of the present embodiment, the radiators 60A and the fan 60B are disposed so as to extend over the protected area 22A1 and the crush area 22A2. Therefore, in a case in which the vehicle 100 collides or in a case in which the vehicle 100 is collided with from the rear, although the radiators 60A and the fan 60B are damaged, self-traveling over a short time is possible even if the cooling device 60 is not functioning, and there is no problem because the vehicle 100 can move to a safe place.

Further, in the present embodiment, the radiators 60A are provided at the vehicle transverse direction both sides in the power unit chamber 22A, but the present disclosure is not limited to this. For example, a radiator may be provided at either one of the vehicle transverse direction sides, or three or more radiators may be provided.

Third Embodiment

In a vehicle 110 of a third embodiment, an air conditioning system 70 is added to the structure of the vehicle 10 of the first embodiment. Description hereinafter centers around the points that differ from the first embodiment. Note that structures that are the same as those of the first embodiment are denoted by the same reference numerals.

Figure 11:
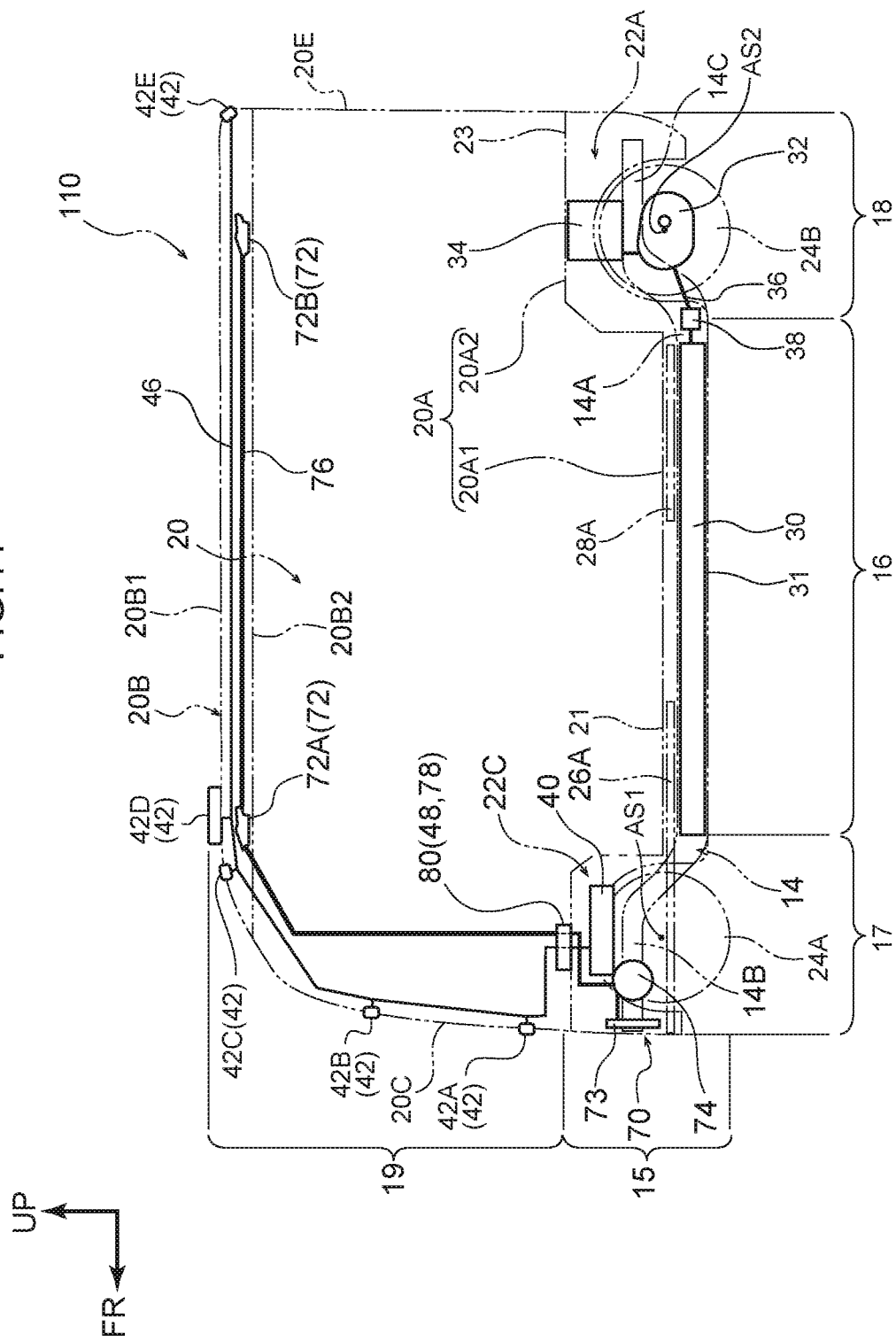
FIG. 11 is a side sectional view of an electric automobile relating to a third embodiment, and is a drawing explaining devices relating to autonomous driving and an air conditioning system.

First, as shown in FIG. 11, at the vehicle 110 of the present embodiment, a floor module 15, which serves as a vehicle lower portion and structures the vehicle lower side, is formed by the center module 16, the front module 17 and the rear module 18. Further, the vehicle 110 has a roof module 19 that serves as a vehicle upper portion and structures the vehicle upper side of the floor module 15. The vehicle 110 of the present embodiment is manufactured by the floor module 15 being formed by joining the center module 16, the front module 17 and the rear module 18 together, and thereafter, further joining the roof module 19 to the floor module 15.

The air conditioning system 70 of the present embodiment has HVAC (heating and ventilating air conditioning) units 72 that serve as in-vehicle units and that control the air within the vehicle cabin, a condenser 73 for carrying out heat exchange, and a compressor 74 that compresses a refrigerant.

The HVAC units 72 are a first HVAC unit 72A that is disposed at the vehicle front side of the roof 20B, and a second HVAC unit 72B that is disposed at the vehicle rear side of the roof 20B. Note that the HVAC units 72 is not limited to two HVAC units, and may be one or three or more. Further, the condenser 73 and the compressor 74 are housed in a sub-unit chamber 22C that is provided at the vehicle lower side of the vehicle front portion. Note that, in the present embodiment, a step that is due to the sub-unit chamber 22C is formed at a portion of the low floor portion 20A1.

The heat exchangers within the respective HVAC units 72, the condenser 73 and the compressor 74 are respectively connected by refrigerant pipes 76, which are pipes. Further, a pipe connector 78 for connecting and disconnecting the refrigerant pipes 76 is provided at the vehicle upper side of the sub-unit chamber 22C. In the present embodiment, the refrigerant pipes 76, which are a set of pipes, extend toward the vehicle upper side from the pipe connector 78 toward the first HVAC unit 72A, and the refrigerant pipes 76 further extend toward the vehicle rear side from the first HVAC unit 72A toward the second HVAC unit 72B. The refrigerant pipes 76 are disposed in a gap between the panel and the interior material that structure the side wall portion 20D, and in the gap between the roof panel 20B1 and the interior material 20B2 that structure the roof 20B.

Figure 12B:
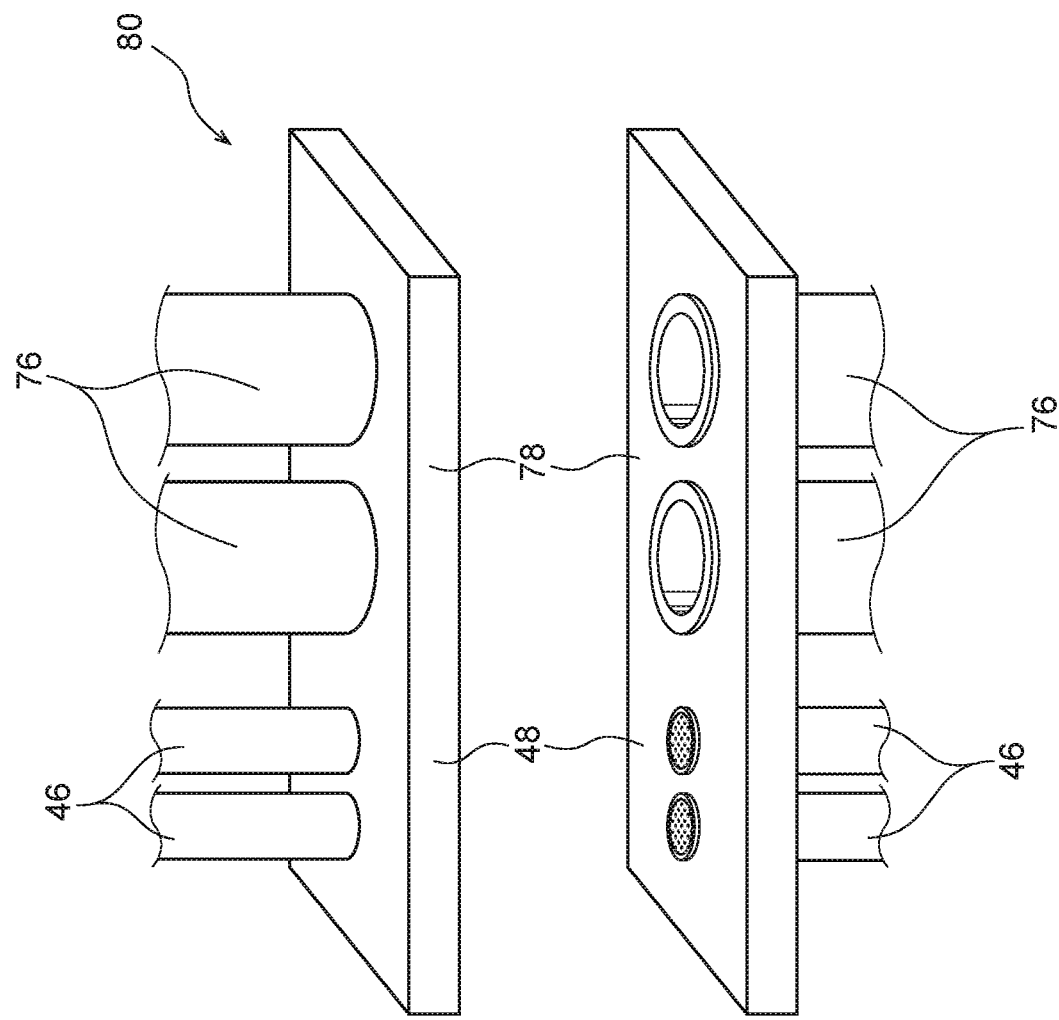
FIG. 12B is a perspective view of a composite connector of the electric automobile relating to the third embodiment.
Figure 12A:
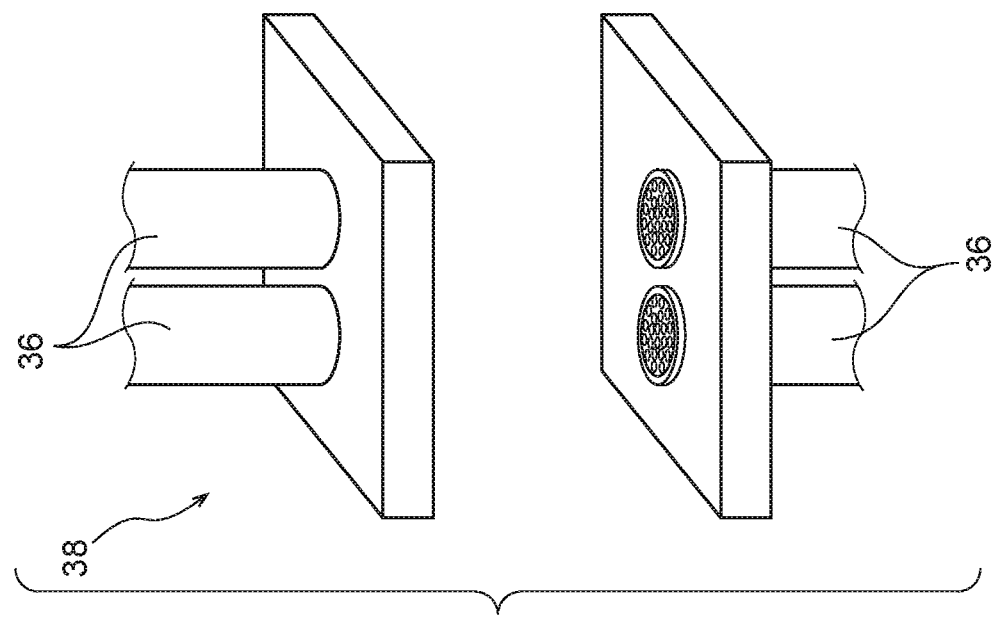
FIG. 12A is a perspective view of a power connector of the electric automobile relating to the third embodiment.

In the present embodiment, the autonomous driving unit 40 is, together with the condenser 73 and the compressor 74, housed in the sub-unit chamber 22C. Further, a signal connector 48, which is for connecting and disconnecting the signal cables 46, is provided at the vehicle upper side of the sub-unit chamber 22C. Here, as shown in FIG. 12B, the signal connector 48 and the pipe connector 78 are structured by a composite connector 80 that is an integral, common connector. This composite connector 80 is disposed at the joined portion of the front module 17 and the roof module 19. In the present embodiment, the signal cables 46 and the refrigerant pipes 76 can be joined, in a state in which pluralities thereof are consolidated together, by the composite connector 80. Note that, as shown in FIG. 12A, the power connector 38 is structured independently of the composite connector 80.

In the present embodiment, the autonomous driving unit 40, the condenser 73 and the compressor 74 are disposed in the front module 17 that is at the vehicle front side, and the power unit 34 and the driving unit 32 are disposed in the rear module 18 that is at the vehicle rear side. On the other hand, because there are degrees of freedom in the accommodated position and the accommodated shape of the battery 30, correspondence with the center modules 16 that have different lengths can be achieved. Therefore, in accordance with the present embodiment, the length of an electric automobile, which has the air conditioning system 70 and at which autonomous driving is possible, can be changed. Namely, plural types of vehicles having different lengths can be manufactured easily.

Further, in the present embodiment, the signal cables 46 that connect the autonomous driving unit 40 and the sensors 42, and the refrigerant pipes 76 that connect the condenser 73 and the compressor 74 with the HVAC units 72, are provided on the same route. Accordingly, in accordance with the structure of the vehicle 110 of the present embodiment, the signal cables 46 and the refrigerant pipes 76 can be arranged efficiently. Moreover, correspondence to the manufacturing of vehicles of different lengths can easily be achieved by changing the lengths of the signal cables 46 and the refrigerant pipes 76.

Further, in the vehicle 110 of the present embodiment, a camera that serves as the sensor 42 is provided at the vehicle front portion. The camera is provided at the vehicle front portion in order to recognize traffic signals. Here, in a case in which the autonomous driving unit 40 is provided at the vehicle rear portion, the signal cables 46 that connect the camera and the autonomous driving unit 40 must be made long. In contrast, in accordance with the present embodiment, by consolidating the camera and the signal cables 46 at the vehicle front portion, the signal cables 46 that connect the both can be made to be short.

In the present embodiment, at the time of manufacturing the vehicle 110, the respective sensors 42, the signal cables 46, the respective HVAC units 72 and the refrigerant pipes 76 are set in advance at the roof module 19, and the autonomous driving unit 40, the condenser 73 and the compressor 74 are set in advance at the floor module 15. Thereafter, the system relating to autonomous driving and the air conditioning system 70 can be formed by joining the roof module 19 to the floor module 15. Namely, in accordance with the present embodiment, because the respective systems that structure the vehicle 110 can be formed together with the vehicle body, manufacturing of the vehicle 110 can be carried out efficiently. In particular, in the present embodiment, the signal connector 48 and the pipe connector 78 are made common as the composite connector 80. Therefore, reducing the number of processes and making production efficient when manufacturing vehicles are devised.

Further, in the present embodiment, the signal connector 48 and the pipe connector 78 are joined by the composite connector 80 at the joined position of the floor module 15 and the roof module 19. Therefore, the replacing of the roof module 19 can be handled easily. Further, in accordance with the present embodiment, differences in the specifications of the roof modules 19 and installation can be handled inexpensively and rapidly.

Fourth Embodiment

In a vehicle 120 of a fourth embodiment, the arrangement of the air conditioning system 70 differs that of the vehicle 110 of the third embodiment. Description hereinafter centers around the points that differ from the third embodiment. Note that structures that are the same as those of the first and third embodiments are denoted by the same reference numerals.

Figure 13:
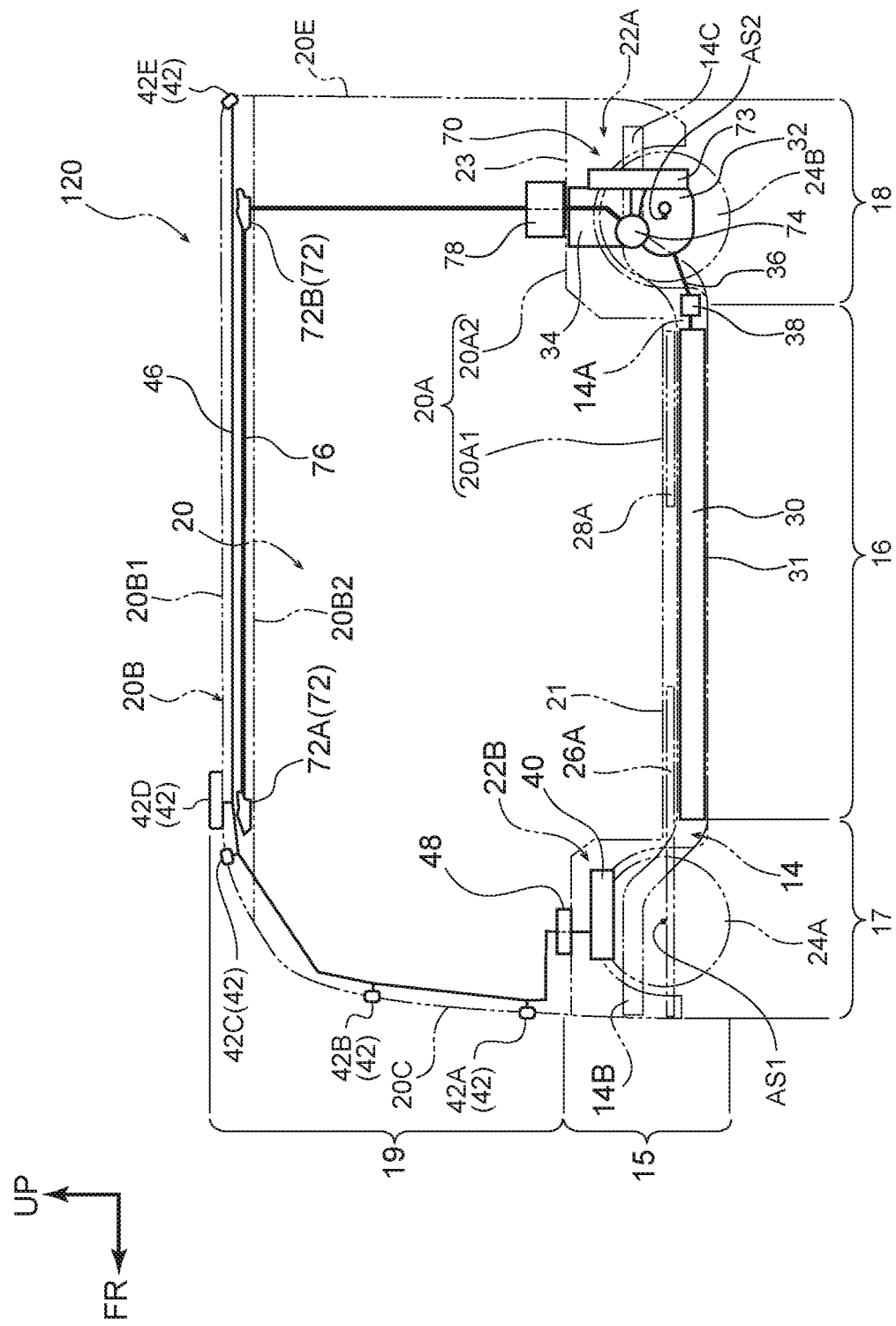
FIG. 13 is a side sectional view of an electric automobile relating to a fourth embodiment, and is a drawing explaining devices relating to autonomous driving and an air conditioning system.

As shown in FIG. 13, the condenser 73 and the compressor 74 of the present embodiment are housed, together with the driving unit 32 and the power unit 34, in the power unit chamber 22A that is provided at the lower portion of the rear module 18. Further, the pipe connector 78 for connecting and disconnecting the refrigerant pipes 76 is provided at the vehicle upper side of the power unit chamber 22A.

In the present embodiment, the refrigerant pipes 76 that are a set of pipes extend toward the vehicle upper side from the pipe connector 78 toward the second HVAC unit 72B, and the refrigerant pipes 76 further extend toward the vehicle front side from the second HVAC unit 72B toward the first HVAC unit 72A. The refrigerant pipes 76 are disposed in the gap between the panel and the interior material that structure of the side wall portion 20D, and in the gap between the roof panel 20B1 and the interior material 20B2 that structure the roof 20B.

In the present embodiment, the autonomous driving unit 40 is accommodated in the projecting portion 22B of the front module 17. The signal connector 48 is provided at the vehicle upper side of the projecting portion 22B. In the present embodiment, the signal connector 48 and the pipe connector 78 are respectively independent connectors. The signal connector 48 is disposed at the joined portion of the front module 17 and the roof module 19, and the pipe connector 78 is disposed at the joined portion of the rear module 18 and the roof module 19.

The vehicle 120 of the present embodiment also has operation and effects that are similar to those of the third embodiment.

Fifth Embodiment

In a vehicle 130 of a fifth embodiment, the arrangement of the autonomous driving unit 40 differs from that of the vehicle 120 of the fourth embodiment. Description hereinafter centers around the points that differ from the fourth embodiment. Note that structures that are the same as those of the first and fourth embodiments are denoted by the same reference numerals.

Figure 14:
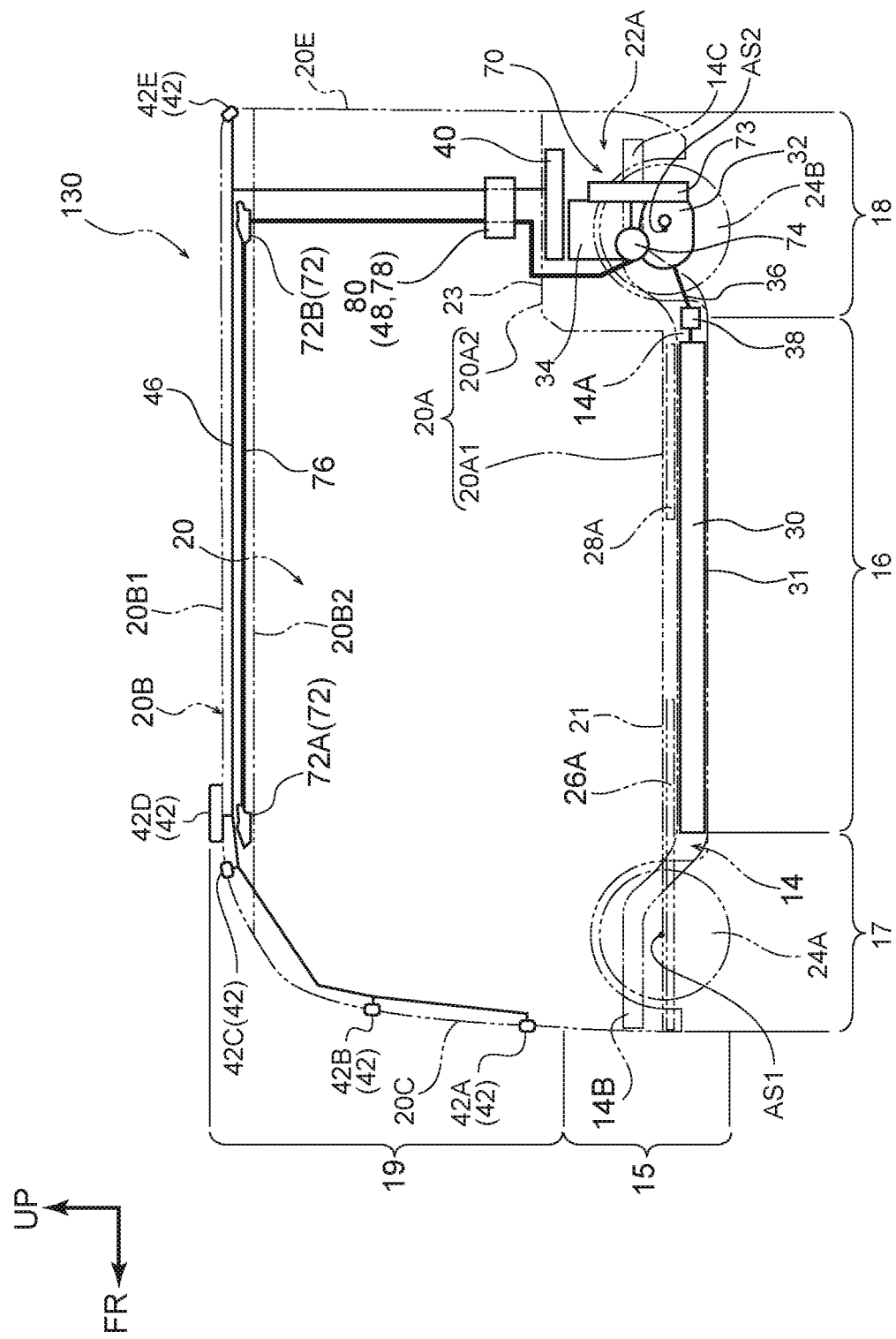
FIG. 14 is a side sectional view of an electric automobile relating to a fifth embodiment, and is a drawing explaining devices relating to autonomous driving and an air conditioning system.

As shown in FIG. 14, the autonomous driving unit 40 of the present embodiment, together with the driving unit 32, the power unit 34, the condenser 73 and the compressor 74, housed in the power unit chamber 22A that is provided at the vehicle rear portion. Further, the composite connector 80, in which the signal connector 48 and the pipe connector 78 are made integral, is provided at the vehicle upper side of the power unit chamber 22A.

In the present embodiment, the signal cables 46 that are connected from the autonomous driving unit 40 to the respective sensors 42 are disposed from the vehicle rear side toward the vehicle front side. Concretely, the signal cables 46 that extend from the autonomous driving unit 40 toward the vehicle upper side first go through the signal connector 48 and are connected to the rear portion sensor 42E, and extend toward the vehicle front side along the roof 20B, and are connected to the upper portion sensor 42D. Moreover, the signal cables 46 are connected to the upper portion sensor 42C and the front portion sensors 42B, 42A.

The vehicle 130 of the present embodiment also has operation and effects that are similar to those of the vehicle 110 of the third embodiment and the vehicle 120 of the fourth embodiment.

(Modified Example of Fifth Embodiment)

In the fifth embodiment, the driving unit 32 and the power unit 34 are housed in the power unit chamber 22A at the rear module 18. However, as a modified example of the present embodiment, the power unit 34 may be provided at the roof module 19. In the case of the present modified example, in addition to the signal connector 48 and the pipe connector 78, the power connector 38 is disposed at the joined portion of the rear module 18 and the roof module 19.

Here, the signal connector 48, the pipe connector 78 and the power connector 38 can be made integral in accordance with the purpose. For example, as shown in FIG. 12A and FIG. 12B, the power connector 38 can be made to be an independent connector, and the signal connector 48 and the pipe connector 78 can be made to be the integrated composite connector 80. By separating the signal connector 48 and the signal cables 46 from the power connector 38 through which high-voltage electric current flows, effects of noise on the autonomous driving unit 40 can be reduced.

Figure 15B:
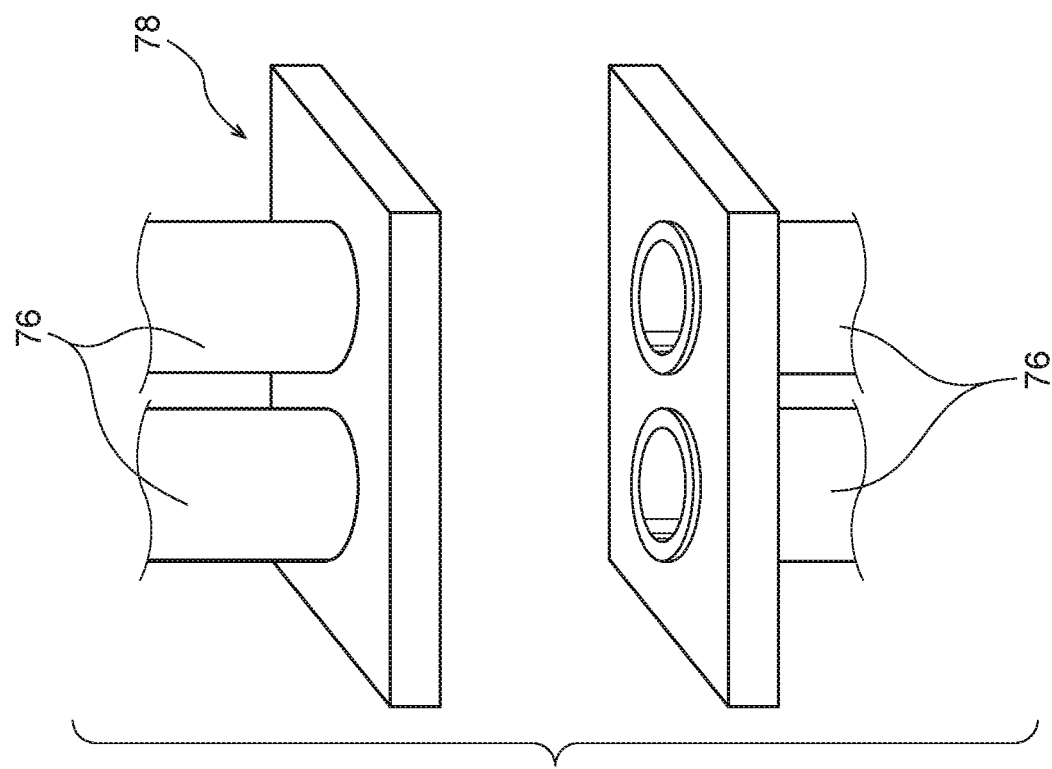
FIG. 15B is a modified example of the fifth embodiment, and is a perspective view of a pipe connector.
Figure 15A:
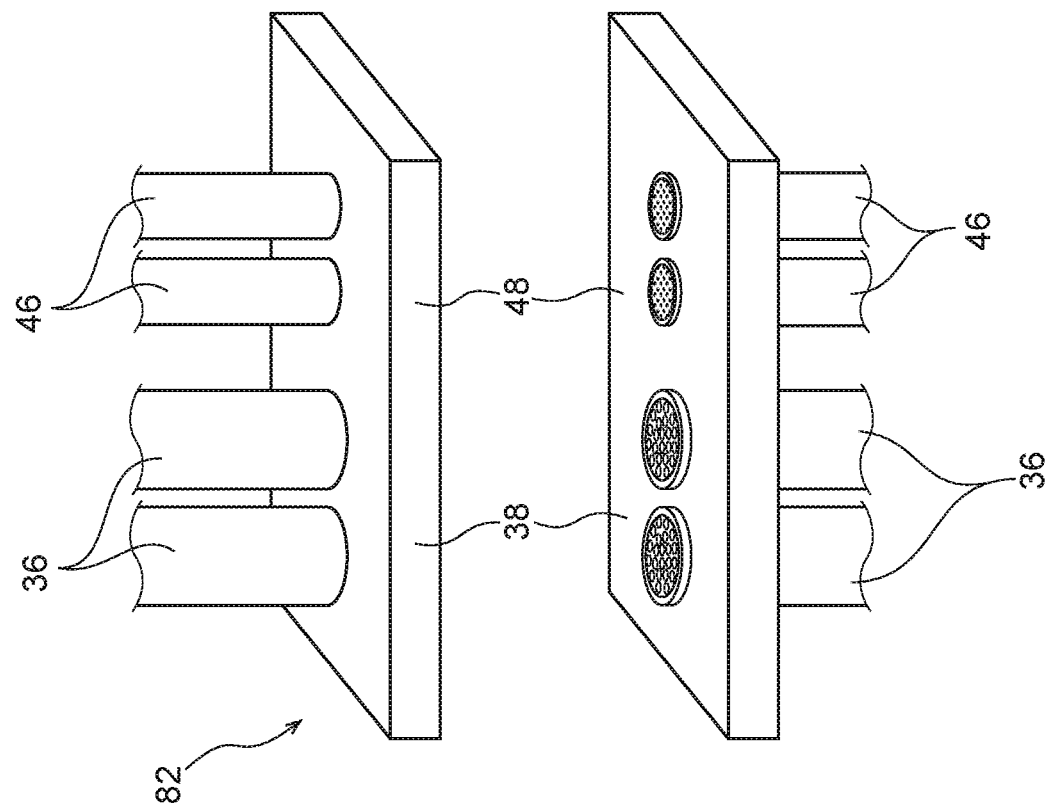
FIG. 15A is a modified example of the fifth embodiment, and is a perspective view of a composite connector.

Further, for example, as shown in FIG. 15A and FIG. 15B, the power connector 38 and the signal connector 48 can be made into a composite connector 82 that is an integral, common connector, and the pipe connector 78 can be made to be an independent connector. Because the refrigerant pipes 76 are less flexible than the power cables 36 and the signal cables 46, the assemblability improves by separating the pipe connector 78 from the composite connector 82. For example, when manufacturing the vehicle, work can be made more efficient if the composite connector 82 is joined after the pipe connector 78, which relates to the refrigerant pipes 76 that have low flexibility, is joined.

Moreover, for example, all of the connectors may be made to be integral. An aggregate connector 84 shown in FIG. 16 is structured as a common connector at which the liquid pipe 56 and the air pipe 57 are connected, in addition to the power connector 38, the signal connector 48, and the pipe connector 78.

In accordance with the aggregate connector 84, because the connecting of the power cables 36, the signal cables 46, the refrigerant pipes 76, the liquid pipe 56 and the air pipe 57 is completed in a single step, the number of work processes at the time of manufacturing the vehicle can be reduced.

Supplemental Explanation

Although the above-described respective embodiments are completely autonomous-driving vehicles that do not have a driver's seat, the present disclosure is not limited to this, and may be a autonomous-driving vehicle that has a driver's seat. Namely, in the respective embodiments, autonomous driving can be carried out usually, and manual driving can be made possible at a time of avoiding danger or at arbitrary times. Note that, by providing the driver's seat at a vehicle transverse direction one side of the vehicle front portion, the front entrance/exit 25 can be provided at the vehicle transverse direction other side of the front wall portion 20C.

The above-described respective embodiments may be applied by being combined respectively. For example, the front and rear may be reversed at the vehicles of the second through fifth embodiments, in the same way as in modified example 1 of the first embodiment. Further, for example, the length of the vehicle central portion may be changed in the vehicles of the second through fifth embodiments, in the same way as in modified example 2 of the first embodiment. Further, for example, the air conditioning system 70 of the third through fifth embodiments may be applied to the vehicle 100 of the second embodiment.

Note that, although the respective HVAC units 72 are provided at the roof 20B in the air conditioning system 70 of the third through fifth embodiments, the present disclosure is not limited to this, and the HVAC unit(s) 72 may be provided at the side wall portion(s) 20D.

What is claimed is:

1. A vehicle structure of an electric automobile, comprising:
   a center module having a battery that is accommodated beneath a floor of a vehicle cabin;
   a front module that is joined to a vehicle front side of the center module;
   a rear module that is joined to a vehicle rear side of the center module;
   a driving unit that is connected to one of the front module or the rear module, and that is connected to the battery; and
   a control unit that is connected to the other of the front module or the rear module, and that controls autonomous driving of the vehicle.

2. The vehicle structure of an electric automobile of claim 1, further comprising:
   a plurality of sensors that are provided at a vehicle front side and a vehicle rear side, and that acquire a situation at a periphery of the vehicle; and
   a wire that extends from the control unit toward a vehicle upper side at the other module, and that extends toward the one module at a vehicle upper portion in order to connect the control unit and the respective sensors.

3. The vehicle structure of an electric automobile of claim 1, further comprising a connector that connects the battery and the driving unit at a joined portion of the center module and the rear module.

4. The vehicle structure of an electric automobile of claim 1, further comprising:
   a battery case in which the battery is accommodated and that is shorter than a vehicle longitudinal direction length of the center module,
   wherein the battery case is disposed at the center module, toward a side opposite from the driving unit side.

5. The vehicle structure of an electric automobile of claim 1, further comprising:
   a battery case in which the battery is accommodated and that has a predetermined length in a vehicle longitudinal direction,
   wherein one or a plurality of battery cases are disposed along the vehicle longitudinal direction at the center module, in accordance with a vehicle longitudinal direction length of the center module.

6. The vehicle structure of an electric automobile of claim 1, wherein the battery is disposed further toward a vehicle lower side than an axle.

7. The vehicle structure of an electric automobile of claim 1, further comprising a vehicle cabin that is formed at least at the center module, and in which passengers can ride in seated postures or standing postures.

8. A vehicle structure of an electric automobile, comprising:
   a selected center module selected from a plurality of center modules, the selected center module having a battery that is accommodated beneath a floor of a vehicle cabin;
   a front module that is joined to a vehicle front side of the selected center module;
   a rear module that is joined to a vehicle rear side of the selected center module;
   a driving unit that is provided at one of the front module or the rear module, and that is connected to the battery; and
   a control unit that is provided at another of the front module or the rear module, and that controls autonomous driving of the vehicle,
   wherein each of the plurality of center modules have different lengths.

9. The vehicle structure of an electric automobile of claim 8, further comprising:
   a plurality of sensors that are provided at a vehicle front side and a vehicle rear side, and that acquire a situation at a periphery of the vehicle; and
   a wire that extends from the control unit toward a vehicle upper side at the other module, and that extends toward the one module at a vehicle upper portion in order to connect the control unit and the respective sensors.

10. The vehicle structure of an electric automobile of claim 8, further comprising a connector that connects the battery and the driving unit at a joined portion of the selected center module and the rear module.

11. The vehicle structure of an electric automobile of claim 8, further comprising:
- a battery case in which the battery is accommodated and that is shorter than a vehicle longitudinal direction length of the selected center module,
- wherein the battery case is disposed at the selected center module, toward a side opposite from the driving unit side.

12. The vehicle structure of an electric automobile of claim 8, further comprising:
- a battery case in which the battery is accommodated and that has a predetermined length in a vehicle longitudinal direction,
- wherein one or a plurality of battery cases are disposed along the vehicle longitudinal direction at the selected center module, in accordance with a vehicle longitudinal direction length of the selected center module.

13. The vehicle structure of an electric automobile of claim 8, wherein the battery is disposed further toward a vehicle lower side than an axle.

14. The vehicle structure of an electric automobile of claim 8, further comprising a vehicle cabin that is formed at least at the selected center module, and in which passengers can ride in seated postures or standing postures.

\* \* \* \* \*